(12) United States Patent
Kasahara et al.

(10) Patent No.: US 6,999,128 B2
(45) Date of Patent: Feb. 14, 2006

(54) STILLNESS JUDGING DEVICE AND SCANNING LINE INTERPOLATING DEVICE HAVING IT

(75) Inventors: Mitsuhiro Kasahara, Hirakata (JP); Tomoaki Daigi, Kadoma (JP); Hideaki Kawamura, Moriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 528 days.

(21) Appl. No.: 10/203,632

(22) PCT Filed: Dec. 13, 2001

(86) PCT No.: PCT/JP01/10955

§ 371 (c)(1),
(2), (4) Date: Aug. 20, 2002

(87) PCT Pub. No.: WO02/054763

PCT Pub. Date: Jul. 11, 2002

(65) Prior Publication Data

US 2003/0011709 A1 Jan. 16, 2003

(30) Foreign Application Priority Data

Dec. 27, 2000 (JP) .............................. 2000-397005

(51) Int. Cl.
*H04N 11/02* (2006.01)
(52) U.S. Cl. ..................... 348/452; 348/700; 348/701
(58) Field of Classification Search ................ 348/452, 348/700, 701; 382/107, 190, 199, 204
See application file for complete search history.

(56) References Cited

U.S. PATENT DOCUMENTS 4,941,046 A * 7/1990 Motoe et al. ............... 348/701

5,051,826 A 9/1991 Ishii et al.
5,631,706 A * 5/1997 Tsunashima ................ 348/452
5,917,554 A * 6/1999 Ohta .......................... 348/581
6,118,488 A 9/2000 Huang

FOREIGN PATENT DOCUMENTS

| EP | 0677958 | 10/1995 |
| JP | 1143480 | 6/1989 |
| JP | 2228185 | 9/1990 |
| JP | 3-30586 | 2/1991 |
| JP | 4326276 | 11/1992 |

(Continued)

OTHER PUBLICATIONS

English Language Abstract for JP Appln. No. 1-143480.

(Continued)

*Primary Examiner*—Victor R. Kostak
(74) *Attorney, Agent, or Firm*—Greenblum & Bernstein, P.L.C.

(57) ABSTRACT

An inter-frame motion detector detects the presence or absence of motion between frames on the basis of judgment whether or not an inter-frame difference is not more than a set value. A vertical edge continuity detector calculates difference values between an object pixel and pixels above or below the object pixel in an inlaid picture, and detects whether or not there is horizontal continuity of an inter-field vertical edge on the basis of judgment whether or not the signs of the difference values are the same continuously over not less than a predetermined number of pixels, in the horizontal direction, including the object pixel. When it is detected that there is no motion between frames, and it is detected that there is horizontal continuity of the inter-field vertical edge, it is judged that a picture is in a completely still state.

20 Claims, 14 Drawing Sheets

FOREIGN PATENT DOCUMENTS

| | | |
|---|---|---|
| JP | 7131678 | 5/1995 |
| JP | 7-170494 | 7/1995 |
| JP | 7298205 | 11/1995 |
| JP | 8-54087 | 2/1996 |

OTHER PUBLICATIONS

English Language Abstract for JP Appln. No. 2-228185.
English Language Abstract for JP Appln. No. 3-30586.
English Language Abstract for JP Appln. No. 4-326276.
English Language Abstract for JP Appln. No. 7-298205.
English Language Abstract for JP Appln. No. 7-131678.
English Language Abstract for JP Appln. No. 7-170494.
English Language Abstract for JP Appln. No. 8-54087.
An article by G. De Haan et al., entitled "Deinterlacing—an Overview," published in *Proceedings of the IEEE*, vol. 86, No. 9, Sep., 1998, pp. 1839-1957.

* cited by examiner

| A>B | A>C | B>C | SELECT |
|---|---|---|---|
| 1 | 0 | 0 | A |
| 0 | 1 | 1 | A |
| 1 | 1 | 1 | B |
| 0 | 0 | 0 | B |
| 1 | 1 | 0 | C |
| 0 | 0 | 1 | C |

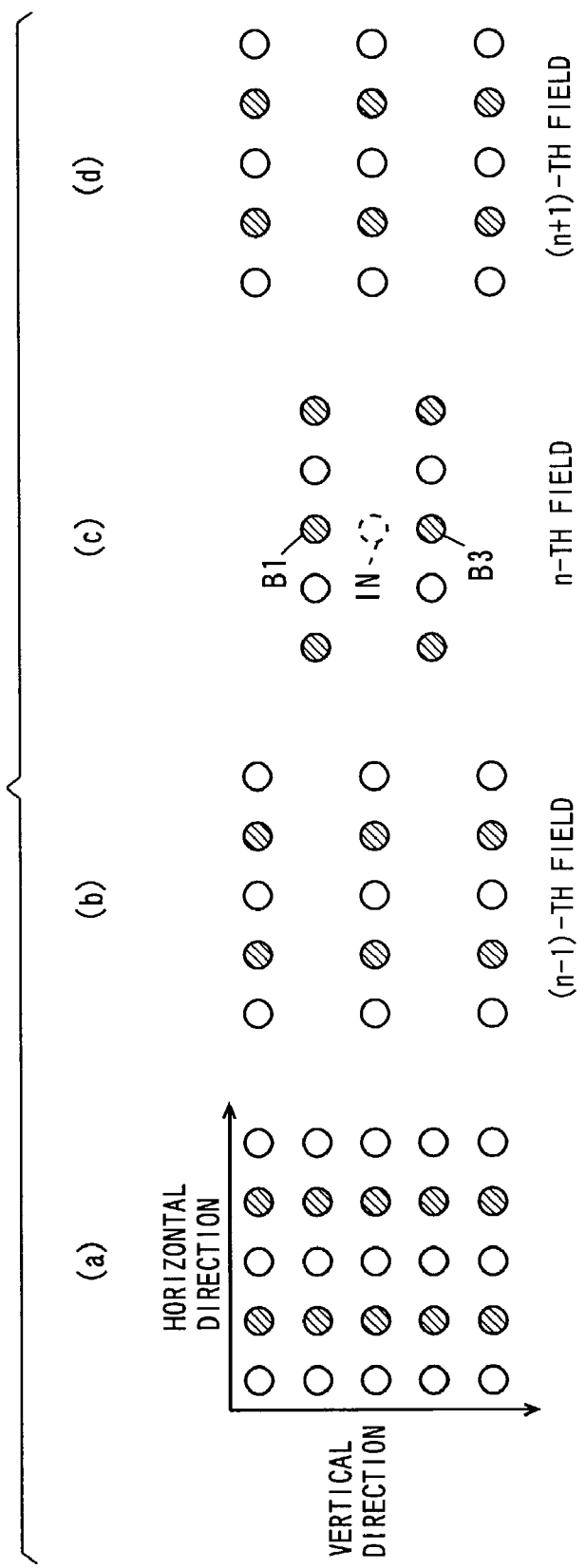

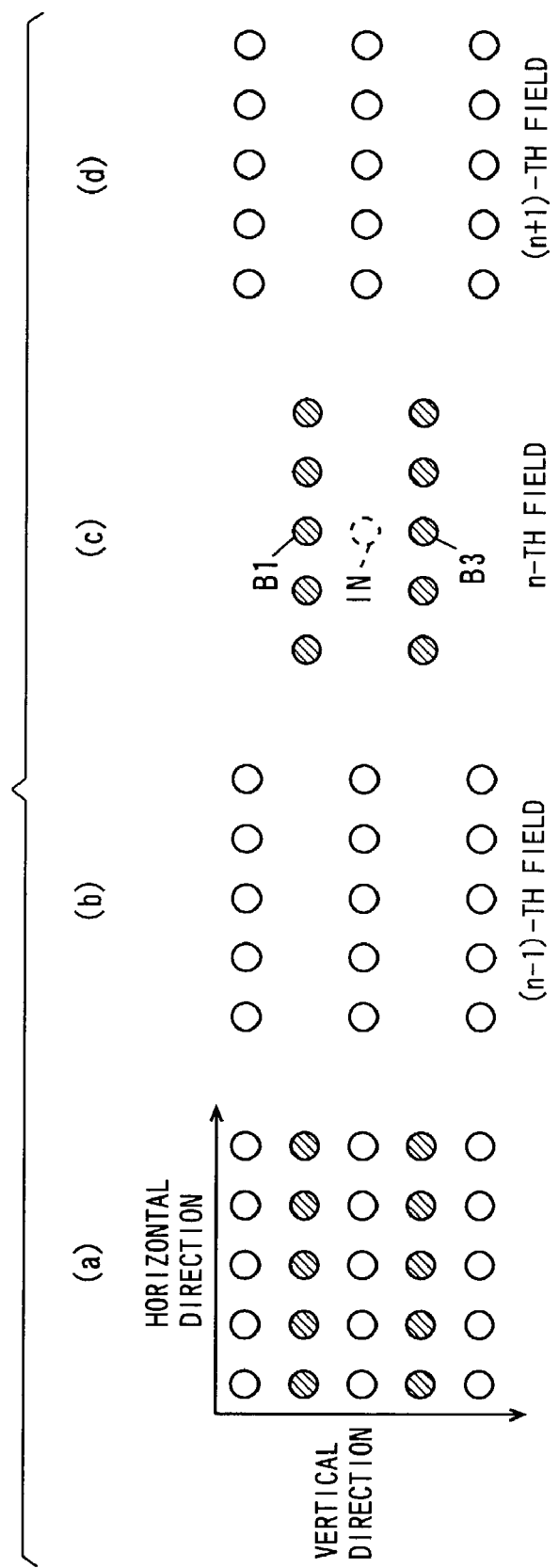

STILLNESS JUDGING DEVICE AND SCANNING LINE INTERPOLATING DEVICE HAVING IT

TECHNICAL FIELD

The present invention relates to a stillness judgment apparatus that judges whether or not a picture stands still and a scanning lines interpolation apparatus using the same.

BACKGROUND ART

As scanning lines conversion techniques for converting picture signals of interlaced scanning into picture signals of progressive scanning, motion adaptive scanning lines interpolation processing is used. In the motion adaptive scanning lines interpolation processing, the motion of pictures by picture signals is detected, to produce interpolation scanning lines by inter-field interpolation using picture signals in the preceding field in the case of still pictures, while producing interpolation scanning lines by inter-field interpolation using picture signals in the same field in the case of moving pictures.

FIG. 14 is a schematic view for explaining conventional scanning lines interpolation processing. In FIG. 14, the vertical axis indicates the vertical direction of a picture, and the horizontal axis indicates time.

FIG. 15 is a diagram showing a picture motion judgment method. In FIG. 15, the vertical axis indicates an inter-frame difference, and the horizontal axis indicates the size of an inter-field vertical edge.

In FIG. 14, A0, A2, and A4 respectively represent pixels in a picture in the (n−1)-field, B1 and B3 respectively represent pixels in a picture in the n-th field, and C0, C2, and C4 respectively represent pixels in a picture in the (n+1)-th field. IN represents a picture to be interpolated (hereinafter referred to as an interpolation pixel).

In a conventional motion judgment method, the difference between pixels in the same coordinates in continuous two frames (an inter-frame difference) and the absolute value of the difference between two pixels which are arranged in the vertical direction in the same field (a vertical edge) are calculated as motion information, to judge whether a picture moves or stands still by a combination of the value of the inter-frame difference and the value of the vertical edge, as shown in FIG. 15.

As the inter-frame difference, the absolute value of the difference between the value of the pixel A2 and the value of the pixel C2, for example, is calculated. As the value of the vertical edge, the difference between the value of the pixel B1 and the value of the pixel B3, for example, is calculated.

When the value of the inter-frame difference is large, and the value of the vertical edge is small, it is judged that the motion of the picture is large (the picture is a moving picture). When the value of the inter-frame difference is small, and the value of the vertical edge is large, it is judged that the motion of the picture is small (the picture is a still picture).

In the above-mentioned conventional motion judgment method, however, the motion and the stillness of the picture, as shown in FIGS. 16 and 17, cannot be accurately judged.

FIG. 16(a) is a schematic view illustrating a vertically striped picture which moves in the horizontal direction, and FIGS. 16(b), 16(c), and 16(d) respectively illustrate a picture in the (n−1)-th field, a picture in the n-th field, and a picture in the (n+1)-th field in a case where the picture shown in FIG. 16(a) is expressed by a interlaced scanning system.

FIG. 17(a) is a schematic view illustrating a horizontally striped picture which stands still, and FIGS. 17(b), 17(c), and 17(d) respectively illustrate a picture in the (n−1)-th field, a picture in the n-th field, and a picture in the (n+1)-th field in a case where the picture shown in FIG. 17(a) is expressed by a interlaced scanning system.

As shown in FIG. 16, in the vertically striped picture which moves in the horizontal direction, the value of the inter-frame difference (C2−A2) is zero, and the value of the vertical edge (B1−B3) is also zero.

As shown in FIG. 17, also in the horizontally striped picture which stands still, the value of the inter-frame difference (C2−A2) is zero, and the value of the vertical edge (B1−B3) is also zero.

In the conventional picture motion judgment method, the vertically striped picture which moves in the horizontal direction and the horizontally striped picture which stands still cannot be thus distinguished.

In JP-A-8-54087, an interpolation method for performing scanning lines interpolation processing without judging the motion of a picture has been proposed. In this method, an intermediate value out of a value calculated using pixels above or below an interpolation pixel in the current field, the value of a pixel in the preceding field in the same coordinates as those of the interpolation pixel, and the value of a pixel in the succeeding field in the same coordinates as those of the interpolation pixel is selected as the value of the interpolation pixel. Consequently, a scanning line can be interpolated without judging a still picture and a moving picture.

According to the above-mentioned interpolation method in which the intermediate value is selected, however, the interpolation pixel which should be black and the interpolation pixel which should be white in the striped picture which completely stands still, for example, may, in some case, be gray. Therefore, it is not desirable that the interpolation method in which the intermediate value is selected is applied to the picture which completely stands still. Consequently, it is necessary to accurately judge whether or not the picture stands still.

An object of the present invention is to provide a stillness judgment apparatus capable of accurately judging whether or not a picture stands still and a scanning lines interpolation apparatus using the same.

DISCLOSURE OF INVENTION

A stillness judgment apparatus according to an aspect of the present invention is a stillness judgment apparatus that judges whether or not a picture stands still on the basis of a picture signal of an interlaced scanning system, comprising an inter-frame motion detection device that calculates a difference value between a pixel in a field preceding the current field and a pixel in a field succeeding the current field in the same coordinates as those of a pixel to be interpolated in the current field on the basis of the picture signal, and detects the presence or absence of motion between frames on the basis of the difference value; a continuity detection device that finds the signs of difference values between pixels in the preceding field or the succeeding field and pixels adjacent thereto on the upper or lower side in the current field on the basis of the picture signal, and detects the presence or absence of horizontal continuity of an inter-field vertical edge on the basis of judgment whether or not the signs are the same continuously over not less than a predetermined number of pixels, in the horizontal direction, including the pixel in the same coordinates as those of the pixel to be interpolated; and a judgment device that judges that the picture stands still when the inter-frame motion detection device detects that there is no motion between frames and the continuity detection device detects that there is horizontal continuity of the inter-field vertical edge.

In the stillness judgment apparatus according to the present invention, the difference value between the pixel in the preceding field and the pixel in the succeeding field in the same coordinates as those of the pixel to be interpolated in the current field is calculated on the basis of the picture signal, and the presence or absence of the motion between frames is detected on the basis of the difference value by the inter-frame motion detection device. Further, the signs of the difference values between pixels in the preceding field or the succeeding field and the pixels adjacent thereto on the upper or lower side in the current field are found, and the presence or absence of the horizontal continuity of the inter-field vertical edge is detected by the continuity detection device on the basis of the judgment whether or not the signs are the same continuously over not less than the predetermined number of pixels, in the horizontal direction, including the pixel in the same coordinates as those of the pixel to be interpolated. When it is detected that there is no motion between frames, and it is detected that there is horizontal continuity of the inter-field vertical edge, the judgment device judges that the picture stands still.

It is possible to thus accurately judge whether or not the picture stands still by using the presence or absence of the motion of the picture between frames and the presence or absence of the horizontal continuity of the inter-field vertical edge.

The continuity detection device may replace, when the absolute value of the difference value between a pixel in the preceding field or the succeeding field and a pixel adjacent thereto on the upper or lower side in the current field is not more than a predetermined value, the difference value with zero.

In this case, when the absolute value of the difference value between a pixel in the preceding field or the succeeding field and a pixel adjacent thereto on the upper or lower side in the current field is not more than the predetermined value, the difference value is replaced with zero to have no sign, to reduce a range in which the picture is considered to be still, thereby making it possible to prevent a moving picture from being erroneously judged to be a still picture.

The continuity detection device may detect that there is horizontal continuity of the inter-field vertical edge when the positive or negative signs of the difference values between pixels in the preceding field or the succeeding field and pixels adjacent thereto on the upper or lower side in the current field are not mixed in a range of not less than the predetermined number of pixels in the horizontal direction and the number of difference values of zero in the range is not more than a predetermined value.

In this case, when the positive or negative signs of the difference values between the pixels in the preceding field or the succeeding field and the pixels adjacent thereto on the upper or lower side in the current field are not mixed in the range of not less than the predetermined number of pixels in the horizontal direction and the number of difference values which become zero in the range is not more than the predetermined value, it is detected that there is horizontal continuity of the inter-field vertical edge. Consequently, the predetermined value of the number of difference values which become zero in the range is adjusted, thereby making it possible to adjust the range in which the picture is considered to be still.

The continuity detection device may detect the presence or absence of horizontal continuity of the inter-field vertical edge between the preceding field and the current field, and detects the presence or absence of horizontal continuity of the inter-field vertical edge between the succeeding field and the current field, and the judgment device may judge that the picture stands still when the inter-frame motion detection device detects that there is no motion between frames and the continuity detection device detects in the same coordinates the horizontal continuity of the inter-field vertical edge between the preceding field and the current field and the horizontal continuity of the inter-field vertical edge between the succeeding field and the current field.

In this case, the presence or absence of the horizontal continuity of the inter-field vertical edge between the preceding field and the current field is detected, and the presence or absence of the horizontal continuity of the inter-field vertical edge between the succeeding field and the current field is detected. When it is detected that there is no motion between frames, and the horizontal continuity of the inter-field vertical edge between the preceding field and the current field and the horizontal continuity of the inter-field vertical edge between the succeeding field and the current field are detected in the same coordinates, it is judged that the picture stands still. Consequently, it is possible to judge with high precision whether or not the picture stands still.

The stillness judgment apparatus may further comprise a vertical edge detection device that calculates a difference value between the pixel to be interpolated and a pixel above or below the pixel to be interpolated in the current field, and detects whether or not the size of the inter-field vertical edge is not less than a predetermined value on the basis of the difference value. The judgment device may also judge that the picture stands still when the inter-frame motion detection device detects that there is no motion between frames and the vertical edge detection device detects that the size of the inter-field vertical edge is not less than the predetermined value.

In this case, the difference value between the pixel to be interpolated and a pixel above or below the pixel to be interpolated in the current field is calculated, and it is detected whether or not the size of the inter-field vertical edge is not less than the predetermined value on the basis of the difference value by the vertical edge detection device. Further, when it is detected that there is no motion between frames, and it is detected that the size of the inter-field vertical edge is not less than the predetermined value, the judgment device also judges that the picture stands still.

In this case, it is possible to enlarge a range in which the picture is considered to be still without reducing the precision of judgment whether or not the picture stands still.

A stillness judgment apparatus according to another aspect of the present invention is a stillness judgment apparatus that judges whether or not a picture stands still on the basis of a picture signal of an interlaced scanning system, comprising inter-frame motion detection means for calculating difference values between a pixel in a field preceding the current field and a pixel in a field succeeding the current field in the same coordinates as those of a pixel to be interpolated in the current field on the basis of the picture signal, and detecting the presence or absence of motion between frames on the basis of the difference value; continuity detection means for finding the signs of difference values between pixels in the preceding field or the succeeding field and pixels adjacent thereto on the upper or lower side in the current field on the basis of the picture signal, and detecting the presence or absence of horizontal continuity of an inter-field vertical edge on the basis of judgment whether or not the signs are the same continuously over not less than a predetermined number of pixels, in the horizontal direction, including the pixel in the same coordinates as those of the pixel to be interpolated; and judgment means for judging that the picture stands still when the inter-frame motion detection means detects that there is no motion between frames and the continuity detection means detects that there is horizontal continuity of the inter-field vertical edge.

In the stillness judgment apparatus according to the present invention, the difference value between the pixel in the preceding field and the pixel in the succeeding field in the same coordinates as those of the pixel to be interpolated in the current field is calculated on the basis of the picture signal, and the presence or absence of the motion between frames is detected on the basis of the difference value by the inter-frame motion detection means. Further, the signs of the difference values between pixels in the preceding field or the succeeding field and the pixels adjacent thereto on the upper or lower side in the current field are found, and the presence or absence of the horizontal continuity of the inter-field vertical edge is detected by the continuity detection means on the basis of the judgment whether or not the signs are the same continuously over not less than the predetermined number of pixels, in the horizontal direction, including the pixel in the same coordinates as those of the pixel to be interpolated. When it is detected that there is no motion between frames, and it is detected that there is horizontal continuity of the inter-field vertical edge, the judgment means judges that the picture stands still.

It is possible to thus accurately judge whether or not the picture stands still by using the presence or absence of the motion of the picture between frames and the presence or absence of the horizontal continuity of the inter-field vertical edge.

The continuity detection means may replace, when the absolute value of the difference value between a pixel in the preceding field or the succeeding field and a pixel adjacent thereto on the upper or lower side in the current field is not more than a predetermined value, the difference value with zero.

In this case, when the absolute value of the difference value between the pixel in the preceding field or the succeeding field and the pixel adjacent thereto on the upper or lower side in the current field is not more than the predetermined value, the difference value is replaced with zero to have no sign, to reduce a range in which the picture is considered to be still, thereby making it possible to prevent a moving picture from being erroneously judged to be a still picture.

The continuity detection means may detect that there is horizontal continuity of the inter-field vertical edge when the positive or negative signs of the difference values between pixels in the preceding field or the succeeding field and pixels adjacent thereto on the upper or lower side in the current field are not mixed in a range of not less than the predetermined number of pixels in the horizontal direction and the number of difference values of zero in the range is not more than a predetermined value.

In this case, when the positive or negative signs of the difference values between the pixels in the preceding field or the succeeding field and the pixels adjacent thereto on the upper or lower side in the current field are not mixed in the range of not less than the predetermined number of pixels in the horizontal direction and the number of difference values which become zero in the range is not more than the predetermined value, it is detected that there is horizontal continuity of the inter-field vertical edge. Consequently, the predetermined value of the number of difference values which become zero in the range is adjusted, thereby making it possible to adjust the range in which the picture is considered to be still.

The continuity detection means may detect the presence or absence of horizontal continuity of the inter-field vertical edge between the preceding field and the current field, and detects the presence or absence of horizontal continuity of the inter-field vertical edge between the succeeding field and the current field, and the judgment means may judge that the picture stands still when the inter-frame motion detection means detects that there is no motion between frames and the continuity detection means detects in the same coordinates the horizontal continuity of the inter-field vertical edge between the preceding field and the current field and the horizontal continuity of the inter-field vertical edge between the succeeding field and the current field.

In this case, the presence or absence of the horizontal continuity of the inter-field vertical edge between the preceding field and the current field is detected, and the presence or absence of the horizontal continuity of the inter-field vertical edge between the succeeding field and the current field is detected. When it is detected that there is no motion between frames, and the horizontal continuity of the inter-field vertical edge between the preceding field and the current field and the horizontal continuity of the inter-field vertical edge between the succeeding field and the current field are detected in the same coordinates, it is judged that the picture stands still. Consequently, it is possible to judge with high precision whether or not the picture stands still.

The stillness judgment apparatus may further comprise vertical edge detection means for calculating a difference value between the pixel to be interpolated and a pixel above or below the pixel to be interpolated in the current field, and detecting whether or not the size of the inter-field vertical edge is not less than a predetermined value on the basis of the difference value. The judgment means may also judge that the picture stands still when the inter-frame motion detection means detects that there is no motion between frames and the vertical edge detection means detects that the size of the inter-field vertical edge is not less than the predetermined value.

In this case, the difference value between the pixel to be interpolated and a pixel above or below the pixel to be interpolated in the current field is calculated, and it is detected whether or not the size of the inter-field vertical edge is not less than the predetermined value on the basis of the difference value by the vertical edge detection means. Further, when it is detected that there is no motion between frames, and it is detected that the size of the inter-field vertical edge is not less than the predetermined value, the judgment device also judges that the picture stands still.

In this case, it is possible to enlarge a range in which the picture is considered to be still without reducing the precision of judgment whether or not the picture stands still.

A scanning lines interpolation apparatus according to still another aspect of the present invention comprises a stillness judgment apparatus that judges whether or not a picture stands still on the basis of a picture signal of an interlaced scanning system; and a scanning lines interpolation circuit that calculates the value of a pixel to be interpolated on the basis of the results of the judgment by the stillness judgment apparatus, to produce an interpolation scanning line, the stillness judgment apparatus comprising an inter-frame motion detection device that calculates a difference value between a pixel in a field preceding the current field and a pixel in a field succeeding the current field in the same coordinates as those of a pixel to be interpolated in the current field on the basis of the picture signal, and detects the presence or absence of motion between frames on the basis of the difference value, a continuity detection device that finds the signs of difference values between pixels in the preceding field or the succeeding field and pixels adjacent thereto on the upper or lower side in the current field on the basis of the picture signal, and detects the presence or absence of horizontal continuity of an inter-field vertical edge on the basis of judgment whether or not the signs are the same continuously over not less than a predetermined number of pixels, in the horizontal direction, including the pixel in the same coordinates as those of the pixel to be interpolated, a judgment device that judges that the picture stands still when the inter-frame motion detection device detects that there is no motion between frames and the continuity detection device detects that there is horizontal continuity of the inter-field vertical edge.

In the scanning lines interpolation apparatus according to the present invention, the stillness judgment apparatus accurately judges whether or not the picture stands still, and the scanning lines interpolation circuit calculates the value of the pixel to be interpolated on the basis of the results of the judgment, to produce the interpolation scanning line. Consequently, it is possible to produce the most suitable interpolation scanning line.

The continuity detection device may replace, when the absolute value of the difference value between a pixel in the preceding field or the succeeding field and a pixel adjacent thereto on the upper or lower side in the current field is not more than a predetermined value, the difference value with zero.

In this case, when the absolute value of the difference value between the pixel in the preceding field or the succeeding field and the pixel adjacent thereto on the upper or lower side in the current field is not more than the predetermined value, the difference value is replaced with zero to have no sign, to reduce a range in which the picture is considered to be still, thereby making it possible to prevent a moving picture from being erroneously judged to be a still picture.

The continuity detection device may detect that there is horizontal continuity of the inter-field vertical edge when the positive or negative signs of the difference values between pixels in the preceding field or the succeeding field and pixels adjacent thereto on the upper or lower side in the current field are not mixed in a range of not less than the predetermined number of pixels in the horizontal direction and the number of difference values of zero in the range is not more than a predetermined value.

In this case, when the positive or negative signs of the difference values between the pixels in the preceding field or the succeeding field and the pixels adjacent thereto on the upper or lower side in the current field are not mixed in the range of not less than the predetermined number of pixels in the horizontal direction and the number of difference values which become zero in the range is not more than the predetermined value, it is detected that there is horizontal continuity of the inter-field vertical edge. Consequently, the predetermined value of the number of difference values which become zero in the range is adjusted, thereby making it possible to adjust the range in which the picture is considered to be still.

The continuity detection device may detect the presence or absence of horizontal continuity of the inter-field vertical edge between the preceding field and the current field, and detects the presence or absence of horizontal continuity of the inter-field vertical edge between the succeeding field and the current field, and the judgment device may judge that the picture stands still when the inter-frame motion detection device detects that there is no motion between frames and the continuity detection device detects in the same coordinates the horizontal continuity of the inter-field vertical edge between the preceding field and the current field and the horizontal continuity of the inter-field vertical edge between the succeeding field and the current field.

In this case, the presence or absence of the horizontal continuity of the inter-field vertical edge between the preceding field and the current field is detected, and the presence or absence of the horizontal continuity of the inter-field vertical edge between the succeeding field and the current field is detected. When it is detected that there is no motion between frames, and the horizontal continuity of the inter-field vertical edge between the preceding field and the current field and the horizontal continuity of the inter-field vertical edge between the succeeding field and the current field are detected in the same coordinates, it is judged that the picture stands still. Consequently, it is possible to judge with high precision whether or not the picture stands still.

The stillness judgment apparatus may further comprise a vertical edge detection device that calculates a difference value between the pixel to be interpolated and a pixel above or below the pixel to be interpolated in the current field, and detects whether or not the size of the inter-field vertical edge is not less than a predetermined value on the basis of the difference value. The judgment device may also judge that the picture stands still when the inter-frame motion detection device detects that there is no motion between frames and the vertical edge detection device detects that the size of the inter-field vertical edge is not less than the predetermined value.

In this case, the difference value between the pixel to be interpolated and a pixel above or below the pixel to be interpolated in the current field is calculated, and it is detected whether or not the size of the inter-field vertical edge is not less than the predetermined value on the basis of the difference value by the vertical edge detection device. Further, when it is detected that there is no motion between frames, and it is detected that the size of the inter-field vertical edge is not less than the predetermined value, the judgment device also judges that the picture stands still.

In this case, it is possible to enlarge a range in which the picture is considered to be still without reducing the precision of judgment whether or not the picture stands still.

A scanning lines interpolation apparatus according to a further aspect of the present invention comprises a stillness judgment apparatus that judges whether or not a picture stands still on the basis of a picture signal of an interlaced scanning system; and a scanning lines interpolation circuit that calculates the value of a pixel to be interpolated on the basis of the results of the judgment by the stillness judgment apparatus, to produce an interpolation scanning line, the stillness judgment apparatus comprising inter-frame motion detection means for calculating a difference value between a pixel in a field preceding the current field and a pixel in a field succeeding the current field in the same coordinates as those of a pixel to be interpolated in the current field on the basis of the picture signal, and detecting the presence or absence of motion between frames on the basis of the difference value, continuity detection means for finding the signs of difference values between pixels in the preceding field or the succeeding field and pixels adjacent thereto on the upper or lower side in the current field on the basis of the picture signal, and detecting the presence or absence of horizontal continuity of an inter-field vertical edge on the basis of judgment whether or not the signs are the same continuously over not less than a predetermined number of pixels, in the horizontal direction, including the pixel in the same coordinates as those of the pixel to be interpolated, and judgment means for judging that the picture stands still when the inter-frame motion detection means detects that there is no motion between frames and the continuity detection means detects that there is horizontal continuity of the inter-field vertical edge.

In the scanning lines interpolation apparatus according to the present invention, the stillness judgment apparatus accurately judges whether or not the picture stands still, and the scanning lines interpolation apparatus calculates the value of the pixel to be interpolated on the basis of the results of the judgment, to produce the interpolation scanning line. Consequently, it is possible to produce the most suitable interpolation scanning line.

The continuity detection means may replace, when the absolute value of the difference value between a pixel in the preceding field or the succeeding field and a pixel adjacent thereto on the upper or lower side in the current field is not more than a predetermined value, the difference value with zero.

In this case, when the absolute value of the difference value between the pixel in the preceding field or the succeeding field and the pixel adjacent thereto on the upper or lower side in the current field is not more than the predetermined value, the difference value is replaced with zero to have no sign, to reduce a range in which the picture is considered to be still, thereby making it possible to prevent a moving picture from being erroneously judged to be a still picture.

The continuity detection means may detect that there is horizontal continuity of the inter-field vertical edge when the positive or negative signs of the difference values between pixels in the preceding field or the succeeding field and pixels adjacent thereto on the upper or lower side in the current field are not mixed in a range of not less than the predetermined number of pixels in the horizontal direction and the number of difference values of zero in the range is not more than a predetermined value.

In this case, when the positive or negative signs of the difference values between the pixels in the preceding field or the succeeding field and the pixels adjacent thereto on the upper or lower side in the current field are not mixed in the range of not less than the predetermined number of pixels in the horizontal direction and the number of difference values which become zero in the range is not more than the predetermined value, it is detected that there is horizontal continuity of the inter-field vertical edge. Consequently, the predetermined value of the number of difference values which become zero in the range is adjusted, thereby making it possible to adjust the range in which the picture is considered to be still.

The continuity detection means may detect the presence or absence of horizontal continuity of the inter-field vertical edge between the preceding field and the current field, and detects the presence or absence of horizontal continuity of the inter-field vertical edge between the succeeding field and the current field, and the judgment means may judge that the picture stands still when the inter-frame motion detection means detects that there is no motion between frames and the continuity detection means detects in the same coordinates the horizontal continuity of the inter-field vertical edge between the preceding field and the current field and the horizontal continuity of the inter-field vertical edge between the succeeding field and the current field.

In this case, the presence or absence of the horizontal continuity of the inter-field vertical edge between the preceding field and the current field is detected, and the presence or absence of the horizontal continuity of the inter-field vertical edge between the succeeding field and the current field is detected. When it is detected that there is no motion between frames, and the horizontal continuity of the inter-field vertical edge between the preceding field and the current field and the horizontal continuity of the inter-field vertical edge between the succeeding field and the current field are detected in the same coordinates, it is judged that the picture stands still. Consequently, it is possible to judge with high precision whether or not the picture stands still.

The stillness judgment apparatus may further comprise vertical edge detection means for calculating a difference value between the pixel to be interpolated and a pixel above or below the pixel to be interpolated in the current field, and detecting whether or not the size of the inter-field vertical edge is not less than a predetermined value on the basis of the difference value. The judgment means may also judge that the picture stands still when the inter-frame motion detection means detects that there is no motion between frames and the vertical edge detection means detects that the size of the inter-field vertical edge is not less than the predetermined value.

In this case, the difference value between the pixel to be interpolated and a pixel above or below the pixel to be interpolated in the current field is calculated, and it is detected whether or not the size of the inter-field vertical edge is not less than the predetermined value on the basis of the difference value by the vertical edge detection means. Further, when it is detected that there is no motion between frames, and it is detected that the size of the inter-field vertical edge is not less than the predetermined value, the judgment means also judges that the picture stands still.

In this case, it is possible to enlarge a range in which the picture is considered to be still without reducing the precision of judgment whether or not the picture stands still.

BRIEF DESCRIPTION OF DRAWINGS

FIG. 16 is a schematic view of vertically striped pictures which move in the horizontal direction before interlaced scanning, in the (n−1)-th field, in the n-th field, and in the (n+1)-th field.

FIG. 17 is a schematic view of horizontally striped pictures which stand still before interlaced scanning, in the (n−1)-th field, in the n-th field, and in the (n+1)-th field.

BEST MODE FOR CARRYING OUT THE INVENTION

Figure 1:
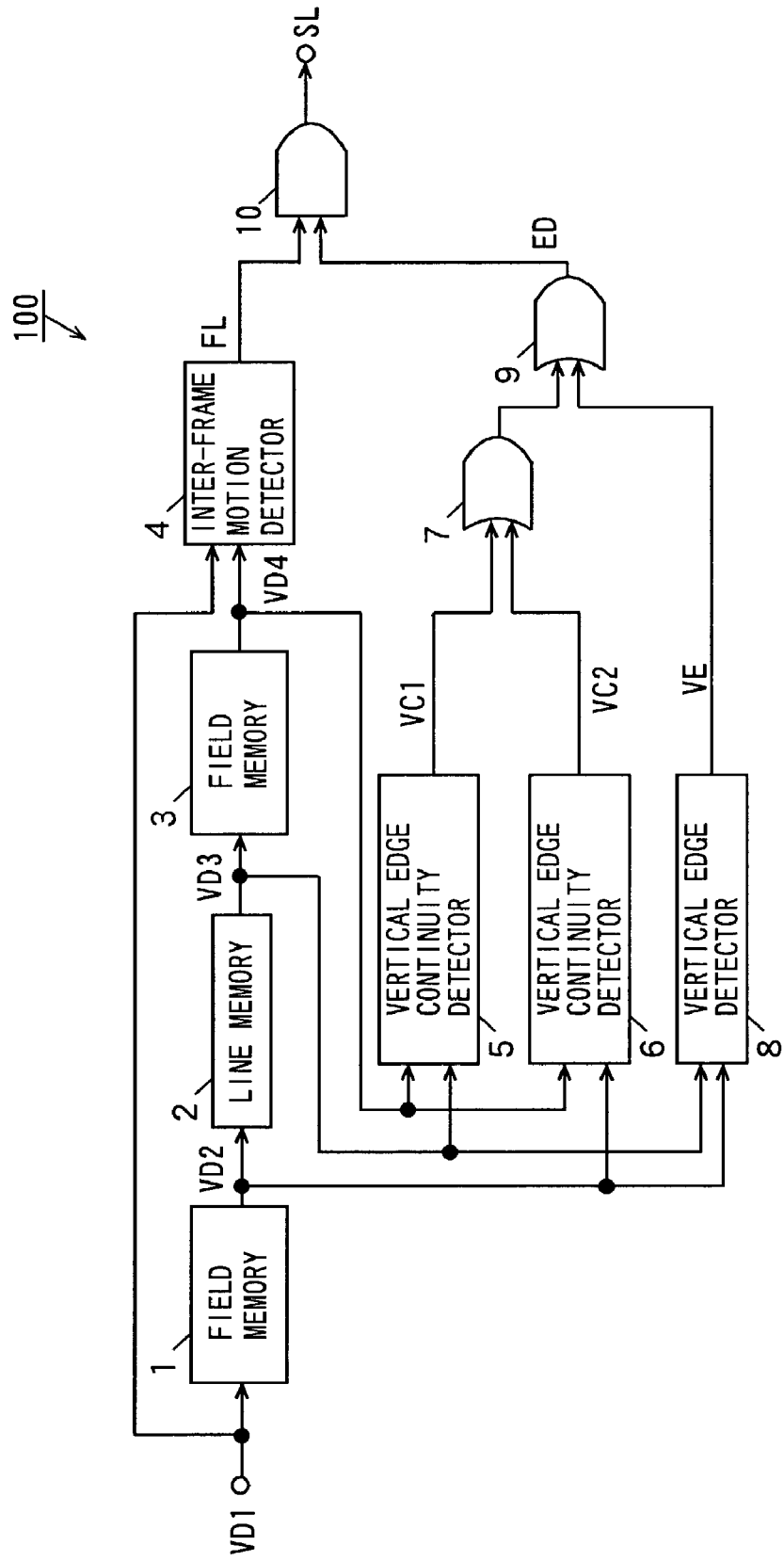
FIG. 1 is a block diagram showing the configuration of a stillness judgment apparatus in an embodiment of the present invention.

FIG. 1 is a block diagram showing the configuration of a stillness judgment apparatus in an embodiment of the present invention.

A stillness judgment apparatus 100 shown in FIG. 1 comprises a field memory 1, a line memory 2, a field memory 3, an inter-frame motion detector 4, vertical edge continuity detectors 5 and 6, a vertical edge detector 8, OR circuits 7 and 9, and an AND circuit 10.

A picture signal VD1 of interlaced scanning is inputted to the field memory 1 and the inter-frame motion detector 4. The field memory 1 delays the inputted picture signal VD1 by one field, to output the delayed picture signal VD1 as a picture signal VD2. The line memory 2 delays the picture signal VD2 outputted from the field memory 1 by one line (one scanning line), to output the delayed picture signal VD2 as a picture signal VD3. The field memory 3 delays the picture signal VD3 outputted from the line memory 2 by one field, to output the delayed picture signal VD3 as a picture signal VD4.

Here, if it is assumed that the picture signals VD2 and VD3 respectively represent pictures in the current field, the picture signal VD1 represents a picture in the succeeding field, and the picture signal VD4 represents a picture in the preceding field. Further, the picture signals VD2 and VD3 represent pictures on two scanning lines which are adjacent to each other in the current field.

The inter-frame motion detector 4 calculates the absolute value of the difference between the values of pixels positioned in the same coordinates in the inputted picture signal VD1 and the picture signal VD4 outputted from the field memory 3, compares the results of the calculation with a set value previously set, and outputs the results of the comparison as an inter-frame motion detection signal FL. The inter-frame motion detector 4 sets the inter-frame motion detection signal FL to "1" when the absolute value of the difference is not more than the set value, while setting the inter-frame motion detection signal FL to "0" when the absolute value of the difference is more than the set value.

Here, the absolute value of the difference between the pixels positioned in the same coordinates in the picture signal VD1 and the picture signal VD4 represents the absolute value of the difference between the pixel in the preceding field and the pixel in the succeeding field which are positioned in the same coordinates as those of a pixel which should be produced by interpolation processing (hereinafter referred to as an interpolation pixel) in the current field. The absolute value of the difference between the pixel in the preceding field and the pixel in the succeeding field is hereinafter referred to as an inter-frame difference.

The vertical edge continuity detector 5 detects horizontal continuity of an inter-field vertical edge in an inlaid picture obtained by inlaying in a picture in the current field a picture in the preceding field on the basis of the picture signal VD3 outputted from the line memory 2 and the picture signal VD4 outputted from the field memory 3, to output the results of the detection as a vertical edge continuity detection signal VC1. The vertical edge continuity detector 5 subtracts from the value of a pixel (a luminance value) on an object scanning line in the preceding field the value of a pixel on a scanning line above the object scanning line in the current field in the inlaid picture, detects whether or not the positive or negative signs of the results of the subtraction are the same continuously over not less than a predetermined number of pixels, in the horizontal direction, including an object pixel, and sets the vertical edge continuity detection signal VC1 to "1" in a case where the signs are the same continuously over not less than the predetermined number of pixels, while setting the vertical edge continuity detection signal VC1 to "0" in the other case.

The vertical edge continuity detector 6 detects horizontal continuity of an inter-field vertical edge in an inlaid picture obtained by inlaying in a picture in the current field a picture in the preceding field on the basis of the picture signal VD2 outputted from the field memory 1 and the picture signal VD4 outputted from the field memory 3, to output the results of the detection as a vertical edge continuity detection signal VC2. The vertical edge continuity detector 6 subtracts from the value of a pixel on an object scanning line in the preceding field the value of a pixel on a scanning line below the object scanning line in the current field in the inlaid picture, detects whether or not the positive or negative signs of the results of the subtraction are the same continuously over not less than a predetermined number of pixels, in the horizontal direction, including an object pixel, and sets the vertical edge continuity detection signal VC2 to "1" in a case where the signs are the same continuously over not less than the predetermined number of pixels, while setting the vertical edge continuity detection signal VC2 to "0" in the other case.

A case where the positive or negative signs of the results of the subtraction of the value of a pixel on an object scanning line in the preceding field and the values of pixels on a scanning line above or below the object scanning line in the current field in an inlaid picture are the same continuously over not less than a predetermined number of pixels including an object pixel is hereinafter referred to as a case where there is horizontal continuity of an inter-field vertical edge.

The vertical edge continuity signal VC1 outputted from the vertical edge continuity detector 5 and the vertical edge continuity signal VC2 outputted from the vertical edge continuity detector 6 are fed to the OR circuit 7. Therefore, an output signal of the OR circuit 7 is "1" in a case where there is horizontal continuity of the inter-field vertical edge, while being "0" in the other case.

The vertical edge detector 8 calculates the absolute value of the difference between the values of pixels in the picture signal VD2 outputted from the field memory 1 and the picture signal VD3 outputted from the line memory 2, compares the results of the calculation with a set value previously set, and outputs the results of the comparison as a vertical edge detection signal VE. The vertical edge detector 8 sets the vertical edge detection signal VE to "1" in a case where the absolute value of the difference is not less than the set value, while setting the vertical edge detection signal VE to "0" in a case where the absolute value of the difference is less than the set value. The absolute value of the difference between the values of the pixels in the picture signal VD2 and the picture signal VD3 represents the size of the inter-field vertical edge.

The output signal of the OR circuit 7 is fed to one input terminal of the OR circuit 9, and the vertical edge detection signal VE outputted from the vertical edge detector 8 is fed to the other input terminal of the OR circuit 9. An output signal ED of the OR circuit 9 is "1" in a case where there is horizontal continuity of the inter-field vertical edge or a case where the size of the inter-field vertical edge is not less than a set value, while being "0" in the other case.

The inter-frame motion detection signal FL outputted from the inter-frame motion detector 4 and the output signal ED of the OR circuit 9 are respectively fed to one input terminal and the other input terminal of the AND circuit 10. A complete stillness judgment signal SL is outputted from the AND circuit 10. The complete stillness judgment signal SL is "1" in a case where the inter-frame difference is not more than a set value and there is horizontal continuity of the inter-field vertical edge or a case where the size of the inter-field vertical edge is not less than a set value, while being "0" in the other case.

The complete stillness judgment signal SL indicates that a picture is in a completely still state in a case where it is "1", while being in the other state in a case where it is "0".

In the present embodiment, the inter-frame motion detector 4 corresponds to an inter-frame motion detection device and inter-frame motion detection means, the vertical edge continuity detectors 5 and 6 correspond to a continuity detection device and continuity detection means, and the OR circuits 7 and 9 and the AND circuit 10 constitute a stillness judgment apparatus and stillness judgment means.

Figure 2:
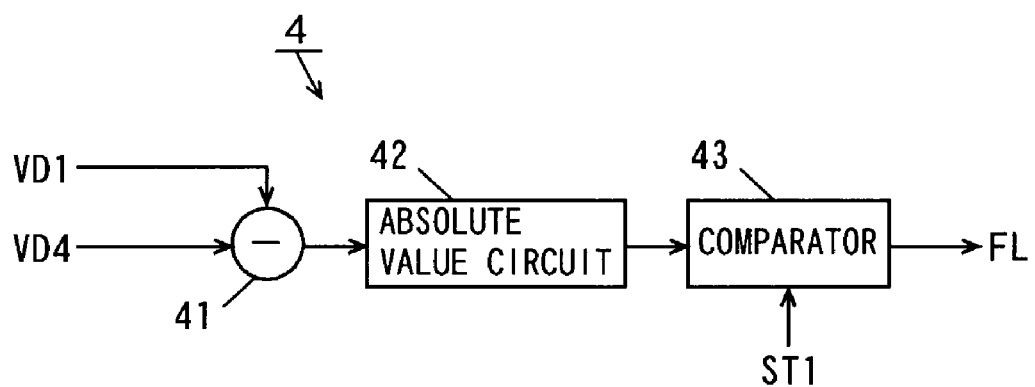
FIG. 2 is a block diagram showing the configuration of an inter-frame motion detector in the stillness judgment apparatus shown in FIG. 1.

FIG. 2 is a block diagram showing the configuration of the inter-frame motion detector 4 shown in FIG. 1. As shown in FIG. 2, the inter-frame motion detector 4 comprises a subtractor 41, an absolute value circuit 42, and a comparator 43.

The subtractor 41 calculates the difference between the inputted picture signal VD1 and the picture signal VD4 outputted from the field memory 3 shown in FIG. 1. The absolute value circuit 42 finds the absolute value of the difference calculated by the subtractor 41, to output the found absolute value as a difference absolute value.

A set value ST1 is previously set in the comparator 43. The comparator 43 compares the difference absolute value outputted from the absolute value circuit 42 with the set value ST1, to output an inter-frame motion detection signal FL having "1" in a case where the difference absolute value is not more than the set value ST1, while outputting an inter-frame motion detection signal FL having "0" in a case where the difference absolute value is more than the set value ST1.

Figure 3:
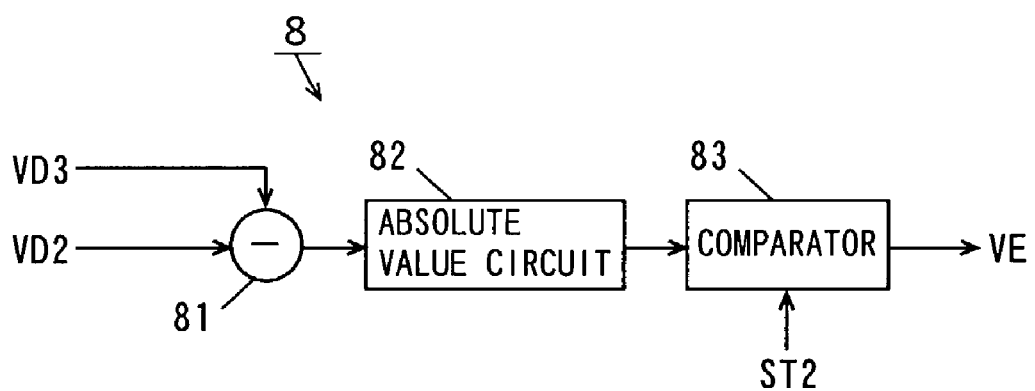
FIG. 3 is a block diagram showing the configuration of a vertical edge detector in the stillness judgment apparatus shown in FIG. 1.

FIG. 3 is a block diagram showing the configuration of the vertical edge detector 8 shown in FIG. 1. In FIG. 3, the vertical edge detector 8 comprises a subtractor 81, an absolute value circuit 82, and a comparator 83.

The subtractor 81 calculates the difference between the picture signal VD3 outputted from the line memory 2 shown in FIG. 1 and the picture signal VD2 outputted from the field memory 1 shown in FIG. 1. The absolute value circuit 82 finds the absolute value of the difference calculated by the subtractor 81, to output the found absolute value as a difference absolute value.

A set value ST2 is previously set in the comparator 83. The comparator 83 compares the difference absolute value outputted from the absolute value circuit 82 with the set value ST2, to output a vertical edge detection signal VE having "1" in a case where the difference absolute value is not less than the set value ST2, while outputting a vertical edge detection signal VE having "0" in a case where the difference absolute value is less than the set value ST2.

Figure 4:
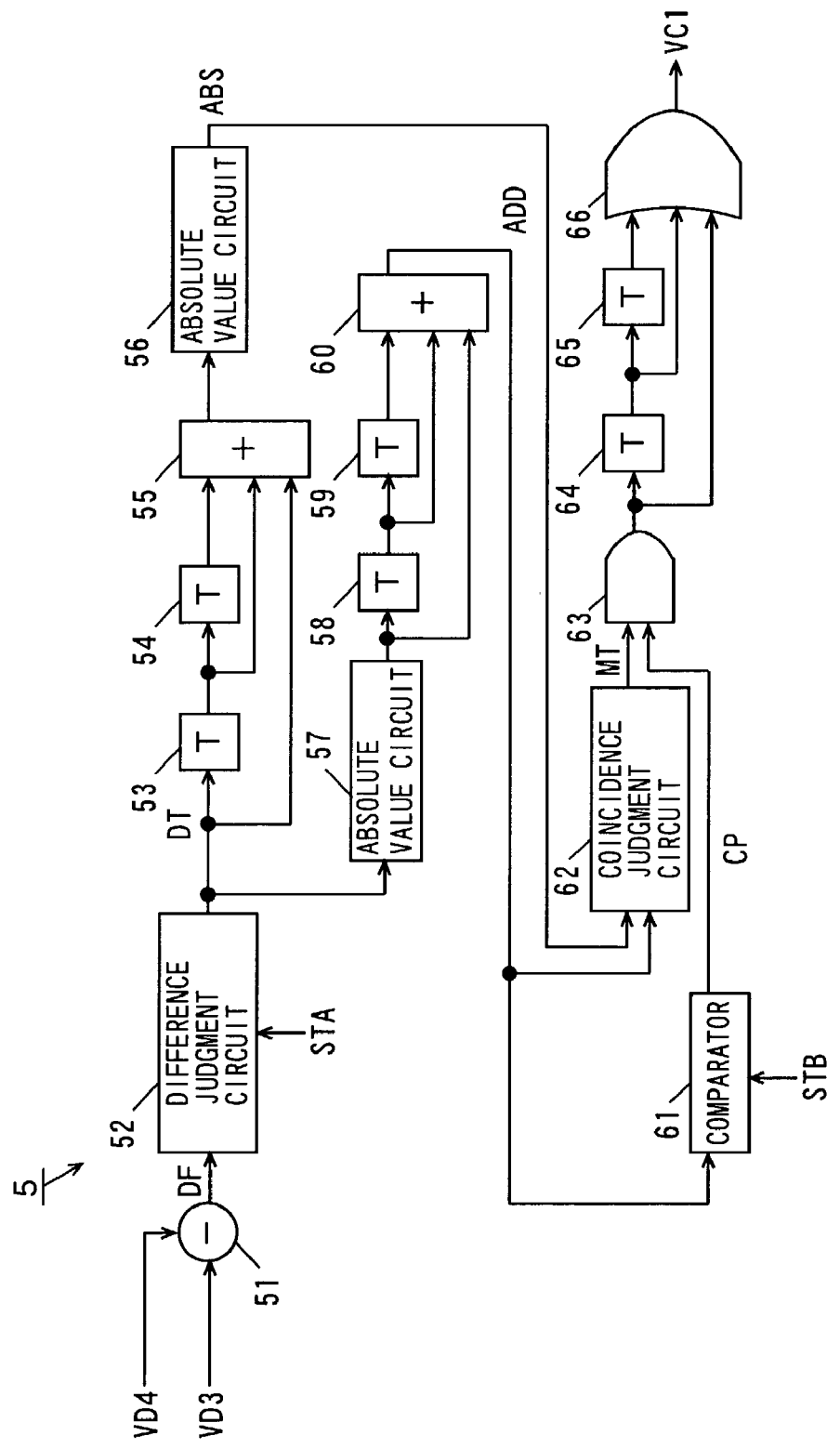
FIG. 4 is a block diagram showing the configuration of a vertical edge continuity detector in the stillness judgment apparatus shown in FIG. 1.

FIG. 4 is a block diagram showing the configuration of the vertical edge continuity detector 5 shown in FIG. 1.

As shown in FIG. 4, the vertical edge continuity detector 5 comprises a subtractor 51, a difference judgment circuit 52, latch circuits (taps) 53, 54, 58, 59, 64, and 65, adders 55 and 60, absolute value circuits 56 and 57, a comparator 61, a coincidence judgment circuit 62, an AND circuit 63, and an OR circuit 66.

The subtractor 51 calculates a difference DF between the picture signal VD4 outputted from the field memory 3 shown in FIG. 1 and the picture signal VD3 outputted from the line memory 2 shown in FIG. 1. A set value STA is previously set in the difference judgment circuit 52. The difference judgment circuit 52 compares the difference DF calculated by the subtractor 51 with the set value STA, to output a judgment signal DT having "+1" in a case where DF>STA, output a judgment signal having "0" in a case where |DF|≦STA, and output a judgment signal DT having "−1" in a case where DF<−1×STA.

In such a manner, the sign of a difference DF between the value of a pixel on an object scanning line in the preceding field and the value of a pixel on a scanning line below the object scanning line in the current field in an inlaid picture, and a judgment signal DT is set to "0" in a case where the absolute value of the difference DF is not more than the set value STA.

The latch circuit 53 delays the judgment signal DT outputted from the difference judgment circuit 52 by one pixel, to output the delayed judgment signal DT. The latch circuit 54 delays the output signal of the latch circuit 53 by one pixel, to output the delayed output signal.

The adder 55 adds the output signal of the latch circuit 54, the output signal of the latch circuit 53, and the judgment signal DT outputted from the difference judgment circuit 52. Consequently, the judgment signals DT for continuous three pixels are added together. The absolute value circuit 56 finds an absolute value ABS of an output signal of the adder 55.

In a case where the judgment signals DT for the continuous three pixels are "+1", "+1", and "+1", and a case where they are "−1", "−1", and "−1", the absolute value ABS is "3". In a case where the judgment signals DT for the three pixels are "+1", "+1", and "0", and a case where they are "−1", "−1", and "0", the absolute value ABS is "2". In a case where the judgment signals DT for the three pixels are "+1", "+1", and "−1", a case where they are "−1", "−1", and "+1", a case where they are "+1", "0", and "0", and a case where they are "−1", "0", and "0", the absolute value ABS is "1". In a case where the judgment signals DT for the three pixels are "+1", "−1", and "0", and a case where they are "0", "0", and "0", the absolute value ABS is "0".

The absolute value circuit 57 finds the absolute value of the judgment signal DT outputted from the difference judgment circuit 52. The latch circuit 58 delays an output signal of the absolute value circuit 57 by one pixel, to output the delayed output signal. The latch circuit 59 delays an output signal of the latch circuit 58 by one pixel, to output the delayed output signal.

The adder 60 adds the output signal of the latch circuit 59, the output signal of the latch circuit 58, and the output signal of the absolute value circuit 57, to output an added value ADD.

In a case where the judgment signals DT for the continuous three pixels are "+1", "+1", and "+1", a case where they are "−1", "−1", and "−1", a case where they are "+1", "+1", and "−1", and a case where they are "−1", "−1", and "+1", the added value ADD is "3". In a case where the judgment signals DT for the three pixels are "+1", "+1", and "0", a case where they are "−1", "−1", and "0", and a case where they are "+1", "−1", and "0", the added value ADD is "2". In a case where the judgment signals DT for the three pixels are "+1", "0", and "0", and a case where they are "−1", "0", and "0", the added value ADD is "1". In a case where the judgment signals DT for the three pixels are "0", "0", and "0", the added value ADD is "0". That is, the added value ADD is "3" in a case where the judgment signals DT for the three pixels do not include "0", is "2" in a case where they include one "0", is "1" in a case where they include two "0", and is "0" in a case where they include three "0".

A set value STB is previously set in the comparator 61. The comparator 61 compares the added value ADD obtained by the adder 60 with the set value STB, to output a comparison signal CP having "1" in a case where ADD≧STB, while outputting a comparison signal CP having "0" in a case where ADD<STB.

When the set value STB is "2", for example, the comparison signal CP is "1" in a case where the judgment signals DT for the three pixels do not include "0" or a case where they include one "0".

It is thus judged whether or not the number of "0" included in the judgment signals DT for the continuous three pixels is not more than a predetermined value.

The coincidence judgment circuit 62 compares the absolute value ABS found by the absolute value circuit 56 with the added value ADD obtained by the adder 60, to output a judgment signal MT having "1" in a case where the absolute value ABS and the added value ADD coincide with each other, while outputting a judgment signal MT having "0" in a case where the absolute value ABS and the added value ADD do not coincide with each other.

In a case where the judgment signals DT for the continuous three pixels include only either one of "+1" and "−1", that is, a case where the positive and negative signs are not mixed in the judgment signals, the absolute value ABS and the added value ADD coincide with each other. In this case, the judgment signal MT is "1".

The judgment signal MT outputted from the coincidence judgment circuit 62 and the comparison signal CP outputted from the comparator 61 are respectively fed to one input terminal and the other input terminal of the AND circuit 63. An output signal of the AND circuit 63 is "1" in a case where both the judgment signal MT and the comparison signal CP are "1", while being "0" in the other case.

That is, in a case where the number of "0" included in the judgment signals DT for the continuous three pixels is not more than a predetermined value, and the positive and negative signs are not mixed in the judgment signals DT for the continuous three pixels, the output signal of the AND circuit 63 is "1".

The latch circuit 64 delays the output signal of the AND circuit 63 by one pixel, to output the delayed output signal. The latch circuit 65 delays the output signal of the latch circuit 64 by one pixel, to output the delayed output signal. The output signal of the AND circuit 63, the output signal of the latch circuit 64, and the output signal of the latch circuit 65 are respectively fed to first, second and third input terminals of the OR circuit 66. Consequently, the OR circuit 66 outputs a vertical edge continuity detection signal VC1 having "1" in a case where at least one of the output signal of the AND circuit 63, the output signal of the latch circuit 64, and the output signal of the latch circuit 65 is "1", while outputting a vertical edge continuity detection signal VC1 having "0" in the other case.

The configuration of the vertical edge continuity detector 6 shown in FIG. 1 is the same as the configuration of the vertical edge continuity detector 5 shown in FIG. 4 except for the following. In the vertical edge continuity detector 6 shown in FIG. 1, the picture signal VD2 is fed, in place of the picture signal VD3 shown in FIG. 4, to the subtractor 51, so that the vertical edge continuity detection signal VC2 is outputted from the OR circuit 66.

According to the vertical edge continuity detectors 5 and 6, it is judged that there is horizontal continuity of the inter-field vertical edge in a case where the signs of the differences DF between the value of the pixel on the object scanning line in the preceding field and the values of the pixels in the scanning line above or below the object scanning line in the current field in the inlaid picture are the same continuously over not less than the predetermined number of pixels, in the horizontal direction, including the object pixel. In this case, the judgment signal DT is set to "0" in a case where the absolute value of the difference DF is not more than the set value STA, and it is judged that there is horizontal continuity of the inter-field vertical edge in a case where the positive and negative signs of the judgment signal DT are not mixed in a range of not less than the predetermined number of pixels which are continuous and the number of "0" is not more than the predetermined value in the range.

The judgment signal DT is thus set to "0", thereby making it possible to reduce the range of a completely still state. In this case, the set value STB is adjusted, thereby making it possible to adjust a range in which the picture is considered to be completely still.

Figure 5:
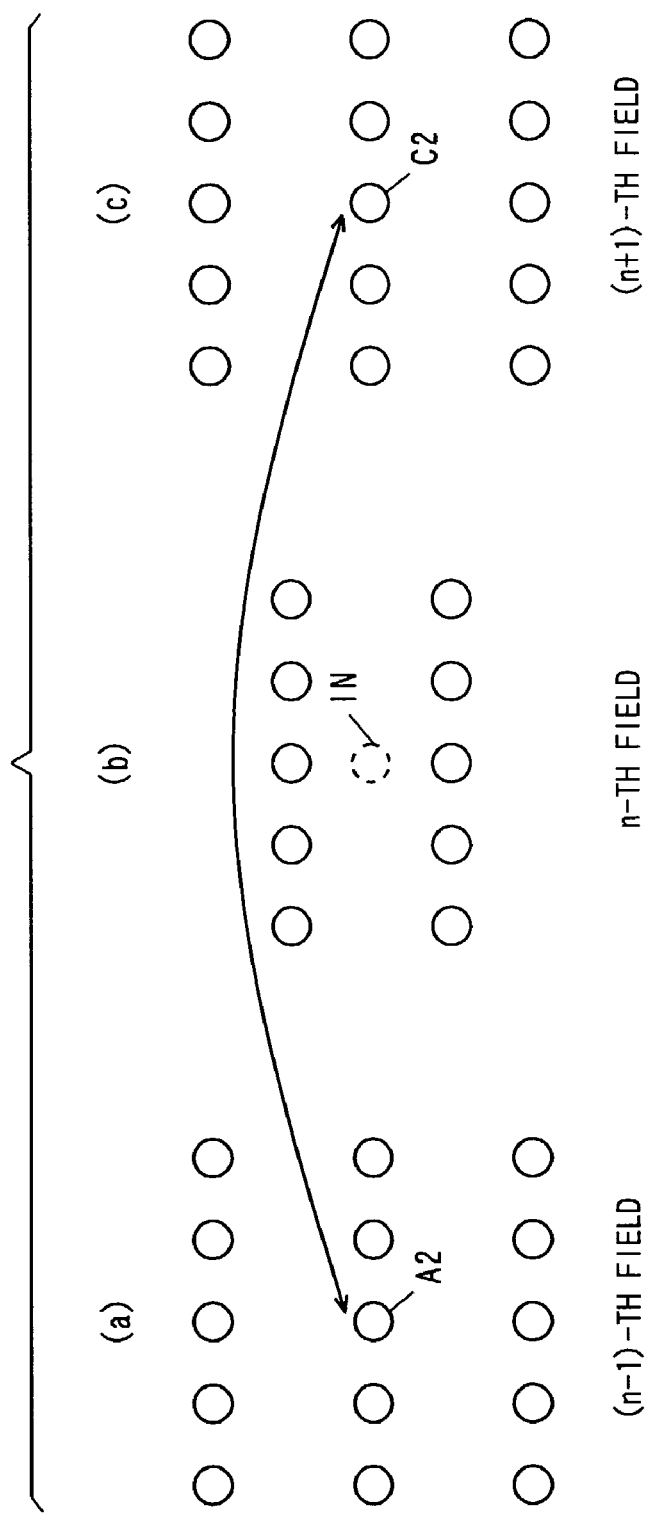
FIG. 5 is a schematic view for explaining the calculation of an inter-frame difference by the stillness judgment apparatus shown in FIG. 1.
Figure 6:
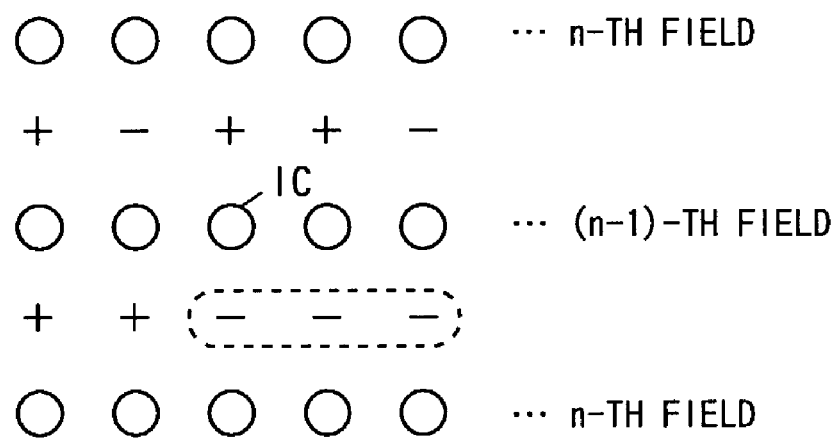
FIG. 6 is a schematic view for explaining the detection of horizontal continuity of an inter-field vertical edge by the stillness judgment apparatus shown in FIG. 1.

FIG. 5 is a schematic view for explaining the calculation of an inter-frame difference by the stillness judgment apparatus 100 shown in FIG. 1. FIG. 6 is a schematic view for explaining the detection of horizontal continuity of an inter-field vertical edge by the stillness judgment apparatus 100 shown in FIG. 1.

FIGS. 5(a), 5(b), and 5(c) respectively illustrate pictures in the (n−1)-th field, the n-th field, and the (n+1)-th field. When the picture in the n-th field is a picture in the current field, the picture in the (n−1)-th field is a picture in the preceding field, and the picture in the (n+1)-th field is a picture in the succeeding field.

IN represents an interpolation pixel in the n-th field, A2 represents a pixel in the (n−1)-th field in the same coordinates as those of the interpolation pixel IN in the n-th field, and C2 represents a pixel in the (n+1)-th field in the same coordinates as those of the interpolation pixel IN in the n-th field.

The first condition required for a picture to be in a completely still state is that the difference between the value of the pixel A2 (a luminance value) in the (n−1)-th field and the value of the pixel C2 (a luminance value) in the (n+1)-th field in the same coordinates as those of the interpolation pixel IN in the n-th field should be not more than the set value ST1, as shown in FIG. 5. That is, the first condition for the completely still state is that the inter-frame difference should be not more than the set value ST1.

FIG. 6 illustrates an inlaid picture obtained by inlaying the picture in the (n−1)-th field shown in FIG. 5(a) in the picture in the n-th field shown in FIG. 5(b). In FIG. 6, IC represents an object pixel.

In the inlaid picture shown in FIG. 6, the difference between the value of a pixel in the (n−1)-th field and the value of a pixel in the n-th field above or below the (n−1)-th field is calculated, to find the positive or negative sign of the difference.

The second condition required for a picture to be in a completely still state is that the positive or negative signs of the differences between the value of the pixel in the (n−1)-th field and the values of the pixels in the n-th field above or below the (n−1)-th field in the inlaid picture should be the same continuously over not less than a predetermined number of pixels, in the horizontal direction, including the object pixel IC, as shown in FIG. 6. That is, the second condition for the completely still state is that there should be horizontal continuity of the inter-field vertical edge. For example, the second condition for the completely still state is that the signs of the differences should be the same continuously over three or more pixels, as enclosed by a dotted line in FIG. 6.

In the stillness judgment apparatus 100 shown in FIG. 1, when the difference between the value of the pixel A2 (a luminance value) in the (n−1)-th field and the value of the pixel C2 (a luminance value) in the (n+1)-th field in the same coordinates as those of the interpolation pixel IN in the n-th field is not more than the set value ST1, and the positive or negative signs of the differences between the value of the pixel in the (n−1)-th field and the values of the pixels in the n-th field above or below the (n−1)-th field in the inlaid picture are the same continuously over not less than the predetermined number of pixels, in the horizontal direction, including the object pixel IC, it is judged that the picture is in a completely still state.

Figure 7:
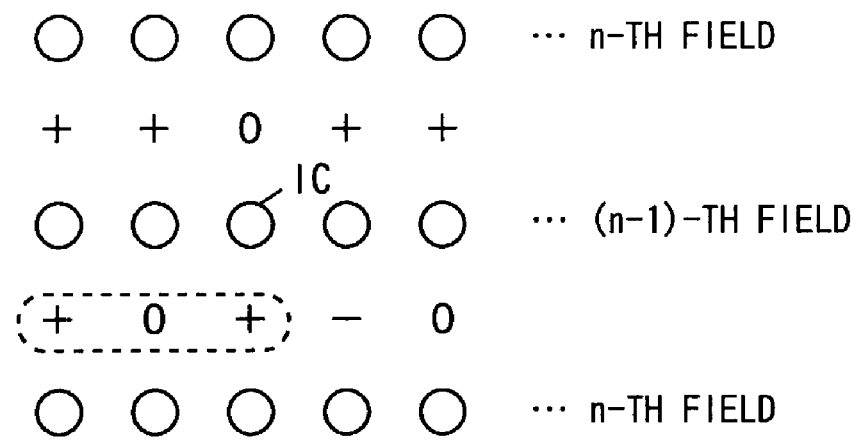
FIG. 7 is a schematic view for explaining the introduction of the concept "0" in the detection of horizontal continuity of an inter-field vertical edge by the stillness judgment apparatus shown in FIG. 1.

FIG. 7 is a schematic view for explaining the introduction of the concept "0" in the detection of horizontal continuity of an inter-field vertical edge by the stillness judgment apparatus 100 shown in FIG. 1.

FIG. 7 also illustrates an inlaid picture obtained by inlaying the picture in the (n−1)-th field shown in FIG. 5(a) in the picture in the n-th field shown in FIG. 5(b). In FIG. 7, IC represents an object pixel.

In the detection of the horizontal continuity of the inter-field vertical edge shown in FIG. 6, when the absolute value of the difference between the value of the pixel in the (n−1)-th field and the value of the pixel in the n-th field above or below the (n−1)-th field is not more than the set value STA, the positive or negative sign is set to "0". Consequently, it is possible to reduce or enlarge a range in which the picture is considered to be completely still.

In this case, when the positive or negative signs are not mixed in a range of not less than the predetermined number of pixels, in the horizontal direction, including the object pixel IC, and the number of "0" in the range is not more than the set value STB, it is judged that the picture is in a completely still state. When the positive or negative signs are not mixed in a range of three or more pixels, and the number of "0" in the range is one or less, as enclosed by a dotted line in FIG. 7, it is judged that the picture is in a completely still state.

In this case, the set value STB of the number of "0" is adjusted, thereby making it possible to adjust a range in which the picture is considered to be completely still.

Although in the above-mentioned example, a predetermined number of pixels under the condition that the positive or negative signs should be the same continuously over not less than the predetermined number of pixels in the horizontal direction in the detection of the horizontal continuity of the inter-field vertical edge is set to three, the present invention is not limited to the same. For example, it can be set to an arbitrary number.

Although a predetermined number of pixels under the condition that the positive or negative signs should not be mixed in the range of not less than the predetermined number of pixels in the horizontal direction is set to three, the present invention is not limited to the same. For example, it can be set to an arbitrary number.

Furthermore, although the set value STB under the condition that the number of "0" in the range of the predetermined number of pixels in the horizontal direction should be not more than the set value STB is set to one, the present invention is not limited to the same. For example, the set value STB can be set to an arbitrary number which is not more than the predetermined number of pixels, for example, two or zero.

Figure 8:
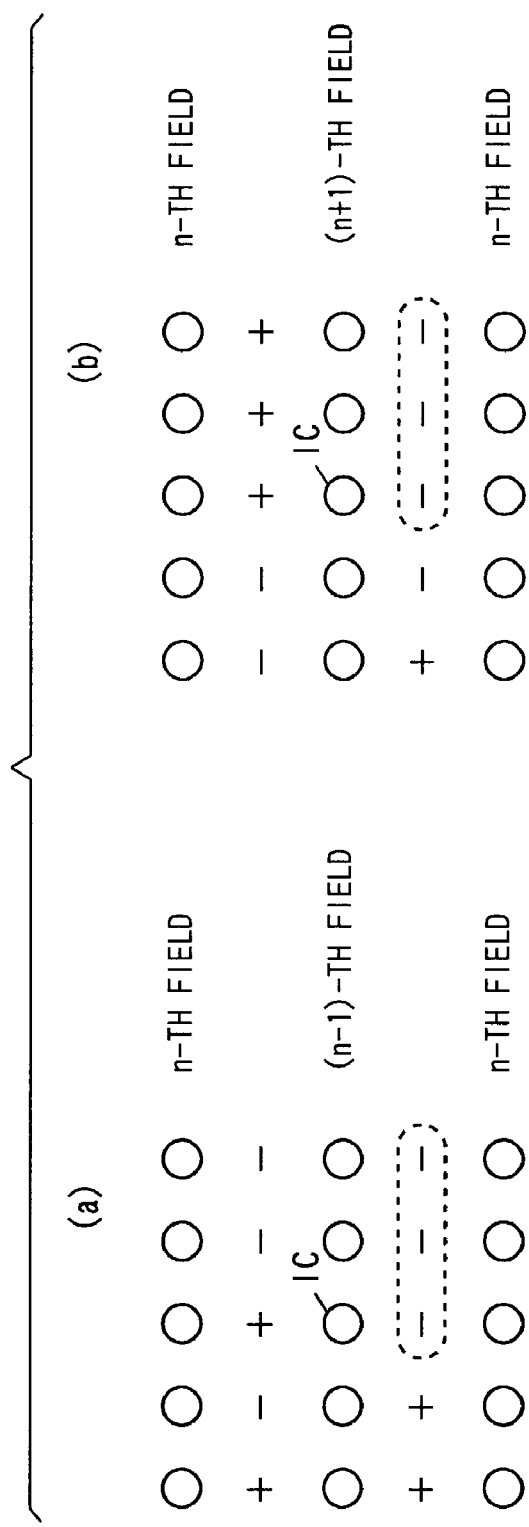
FIG. 8 is a schematic view showing another example of the detection of horizontal continuity of an inter-field vertical edge by the stillness judgment apparatus shown in FIG. 1.

FIG. 8 is a schematic view showing another example of the detection of horizontal continuity of an inter-field vertical edge by the stillness judgment apparatus 100 shown in FIG. 1.

FIG. 8(a) illustrates an inlaid picture obtained by inlaying the picture in the (n−1)-th field shown in FIG. 5(a) in the picture in the n-th field shown in FIG. 5(b), and FIG. 8(b) illustrates an inlaid picture obtained by inlaying the picture in the (n+1)-th field shown in FIG. 5(c) in the picture in the n-th field shown in FIG. 5(b). In FIG. 8, IC represents an object pixel.

When the positive or negative signs of the differences between the value of a pixel in the (n−1)-th field and the values of pixels in the n-th field above or below the (n−1)-th field are the same continuously over not less than a predetermined number of pixels, in the horizontal direction, including the object pixel IC in the inlaid picture shown in FIG. 8(a), the positive or negative signs of the differences between the value of a pixel in the (n+1)-th field and the values of pixels in the n-th field above or below the (n+1)-th field are the same continuously over not less than a predetermined number of pixels, in the horizontal direction, including the object pixel IC in the inlaid picture shown in FIG. 8(b), and the continuity of the positive or negative signs of the differences in the pixels in the same coordinates in the inlaid pictures shown in FIGS. 8(a) and 8(b) is detected, it is judged that there is horizontal continuity of the inter-field vertical edge.

Although in this case, a range in which the picture is considered to be completely still is narrowed, it is possible to prevent the completely still state from being erroneously detected.

In the stillness judgment apparatus 100 shown in FIG. 1, as described above, it is judged that the picture is in a completely still state in a case where the inter-frame difference is not more than the set value ST1 and there is horizontal continuity of the inter-field vertical edge or a case where the size of the inter-field vertical edge is not less than the set value ST2.

Figure 9:
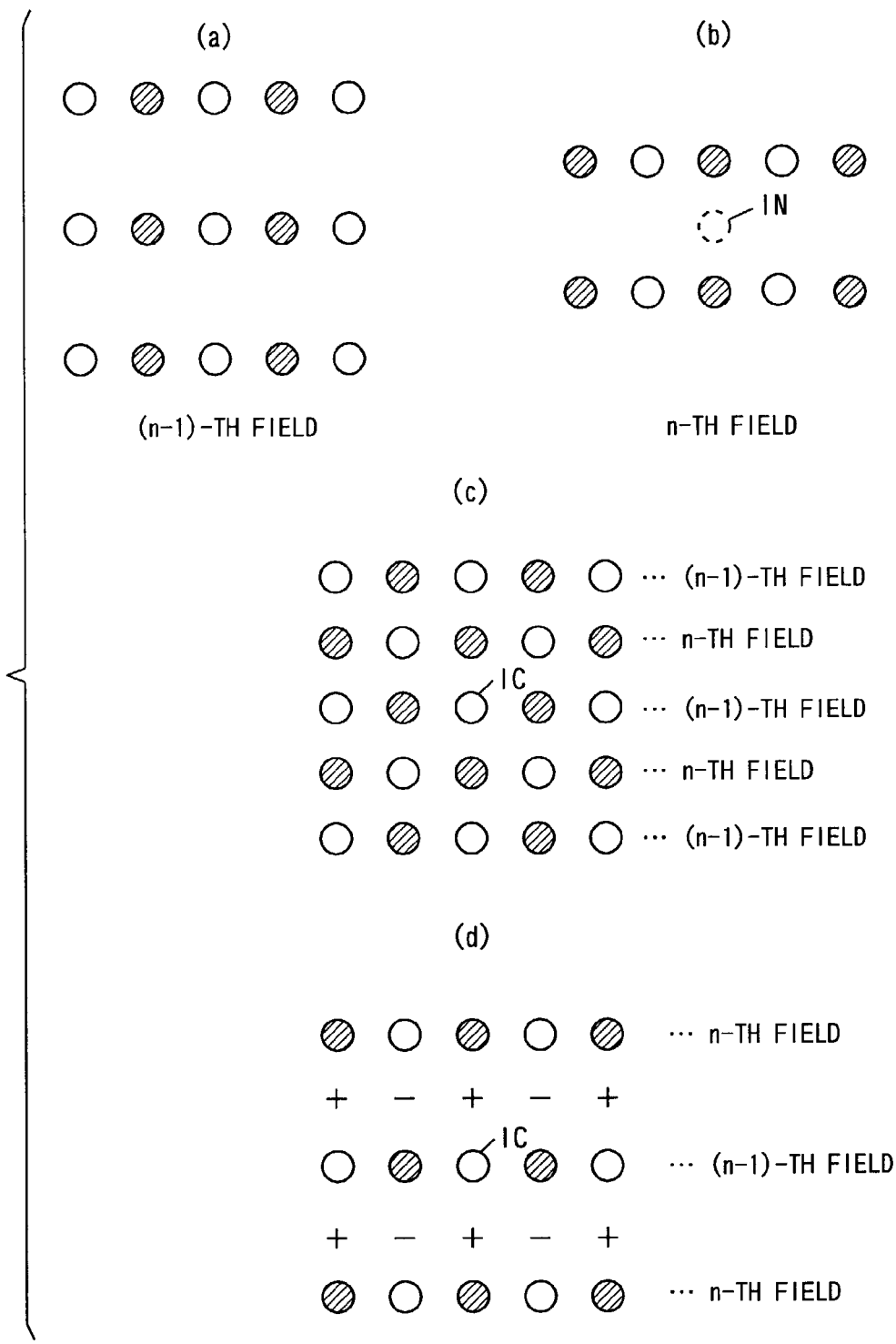
FIG. 9 is a schematic view showing a first example of the judgment of the stillness of a picture by the stillness judgment apparatus shown in FIG. 1.

FIG. 9 is a schematic view showing a first example of judgment of the stillness of a picture by the stillness judgment apparatus 100 shown in FIG. 1. In FIG. 9, IN represents an interpolation pixel in the n-th field, and IC represents an object pixel.

FIGS. 9(a) and 9(b) respectively illustrate a picture in the (n−1)-th field and a picture in the n-th field in a case where the vertically striped picture which moves in the horizontal direction shown in FIG. 16(a) is expressed by an interlaced scanning system. The picture in the (n−1)-th field shown in FIG. 9(a) is inlaid in the picture-in the n-th field shown in FIG. 9(b), thereby obtaining an inlaid picture shown in FIG. 9(c). FIG. 9(d) illustrates the detection of horizontal continuity of an inter-field vertical edge in the inlaid picture shown in FIG. 9(c).

When the positive or negative signs of the differences between the value of a pixel in the (n−1)-th field and the values of pixels in the n-th field above or below the (n−1)-th field are found in the inlaid picture shown in FIG. 9(c), the positive or negative signs are as shown in FIG. 9(d). In FIG. 9(d), there is no horizontal continuity of the positive or negative signs. Accordingly, it is judged that the picture is not in a completely still state.

Figure 10:
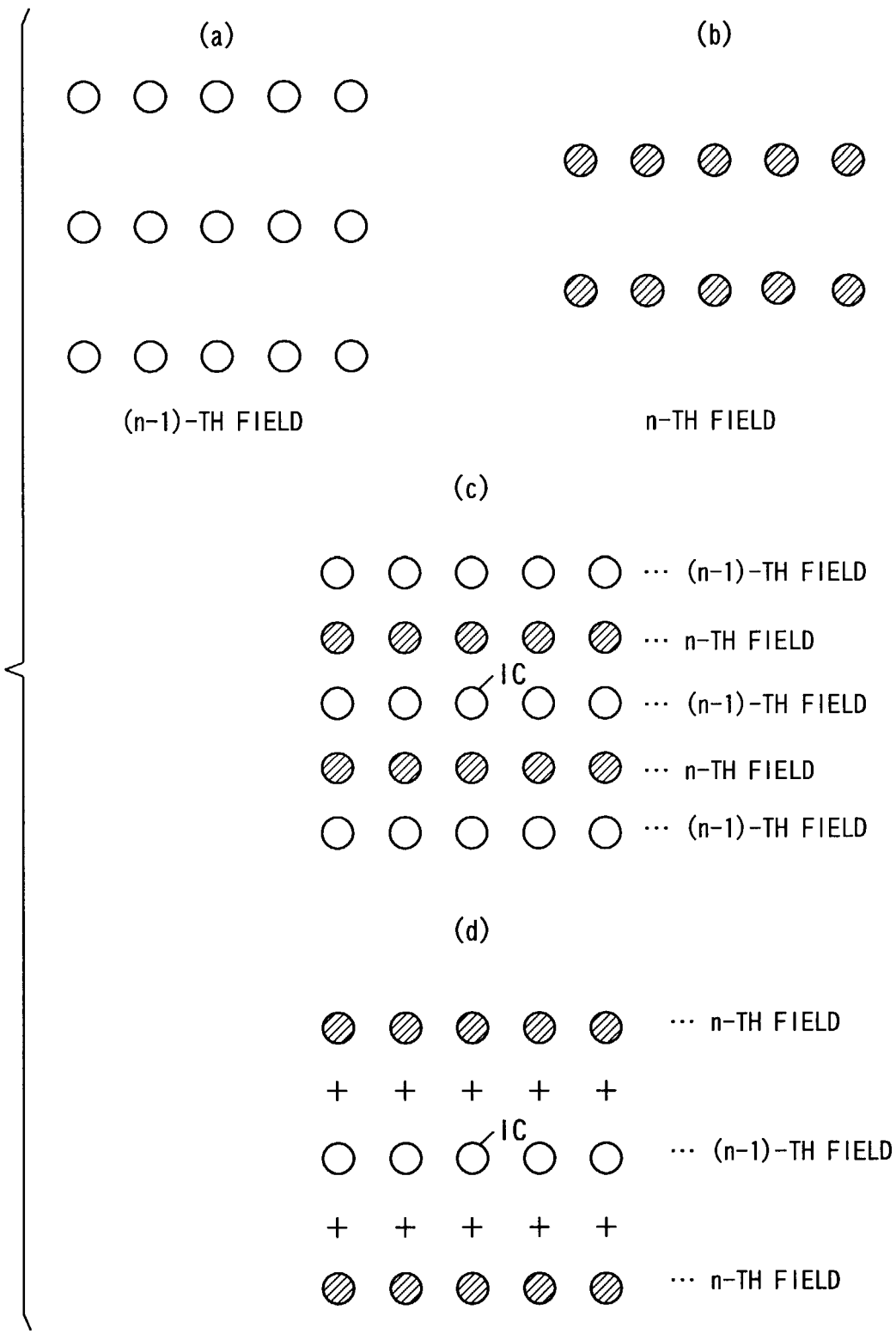
FIG. 10 is a schematic view showing a second example of the judgment of the stillness of a picture by the stillness judgment apparatus shown in FIG. 1.

FIG. 10 is a schematic view showing a second example of judgment of the stillness of a picture by the stillness judgment apparatus 100 shown in FIG. 1. In FIG. 10, IN represents an interpolation pixel in the n-th field, and IC represents an object pixel.

FIGS. 10(a) and 10(b) respectively illustrate a picture in the (n−1)-th field and a picture in the n-th field in a case where the horizontally striped picture which stands still shown in FIG. 17(a) is expressed by an interlaced scanning system. The picture in the (n−1)-th field shown in FIG. 10(a) is inlaid in the picture in the n-th field shown in FIG. 10(b), thereby obtaining an inlaid picture shown in FIG. 10(c). FIG. 10(d) illustrates the detection of horizontal continuity of an inter-field vertical edge in the inlaid picture shown in FIG. 10(c).

When the positive or negative signs of the differences between the value of a pixel in the (n−1)-th field and the values of pixels in the n-th field above or below the (n−1)-th field are found in the inlaid picture shown in FIG. 10(c), the positive or negative signs are as shown in FIG. 10(d). In FIG. 10(d), the positive signs are continuous for five pixels, in the horizontal direction, including the object pixel IC. Accordingly, it is judged that the picture is in a completely still state.

In the stillness judgment apparatus 100 shown in FIG. 1, it is thus possible to judge with high precision whether or not the picture is in a completely still state in the case of conversion from a picture signal of an interlaced scanning system to a picture signal of a progressive scanning system.

It is possible to make complete stillness judgment with hither precision by providing for each pixel a counter along a time axis which adds "1" when a picture is judged to be completely still, while setting an accumulated value to zero when the picture is not judged to be completely still, to judge that the pixel is completely still only when the value of the counter is not less than a predetermined value.

Figure 11:
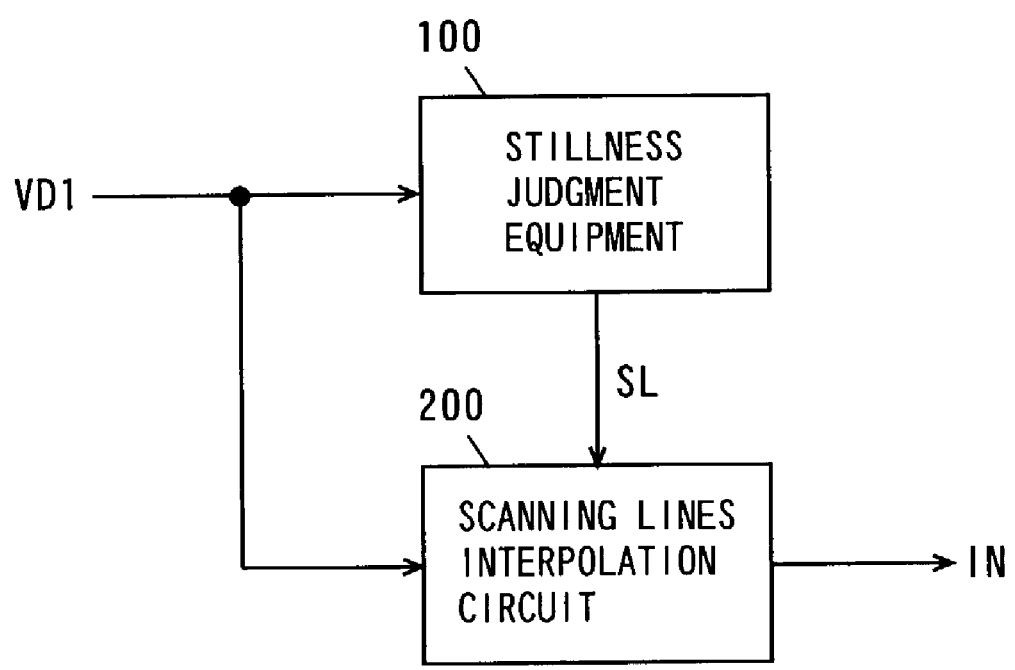
FIG. 11 is a block diagram showing the configuration of a scanning lines interpolation apparatus comprising the stillness judgment apparatus shown in FIG. 1.

FIG. 11 is a block diagram showing the configuration of a scanning lines interpolation apparatus comprising the stillness judgment apparatus 100 shown in FIG. 1.

The scanning lines interpolation apparatus shown in FIG. 11 comprises the stillness judgment apparatus 100 and a scanning lines interpolation circuit 200. The stillness judgment apparatus 100 judges whether or not a picture is in a completely still state by the above-mentioned operations on the basis of a picture signal VD1, to output a complete stillness judgment signal SL. The scanning lines interpolation circuit 200 performs interpolation processing using the picture signal VD1 to calculate the value of an interpolation pixel IN, thereby producing an interpolation scanning line.

In a case where it is not indicated that the complete stillness judgment signal SL outputted form the stillness judgment apparatus 100 is in a completely still state, the scanning lines interpolation circuit 200 calculates the value of an interpolation pixel by interpolation processing for selecting an intermediate value. Alternatively, the scanning lines interpolation circuit 200 can also calculate the value of the interpolation pixel by inter-field interpolation.

In a case where it is indicated that the complete stillness judgment signal SL outputted form the stillness judgment apparatus 100 is in a completely still state, the scanning lines interpolation circuit 200 calculates the value of an interpolation pixel by inter-frame interpolation. For example, the value of a pixel in the preceding field in the same coordinates as those of an interpolation pixel in the current field is outputted as the value of the interpolation pixel, or the average value of the value of the pixel in the preceding field and the value of a pixel in the succeeding field in the same coordinates as those of the interpolation pixel in the current field is outputted as the value of the interpolation pixel.

In the scanning lines interpolation apparatus shown in FIG. 11, the stillness judgment apparatus 100 shown in FIG. 1 is used. Therefore, it is possible to produce the most suitable interpolation scanning line on the basis of judgment whether or not the picture is in a completely still state.

Figure 12:
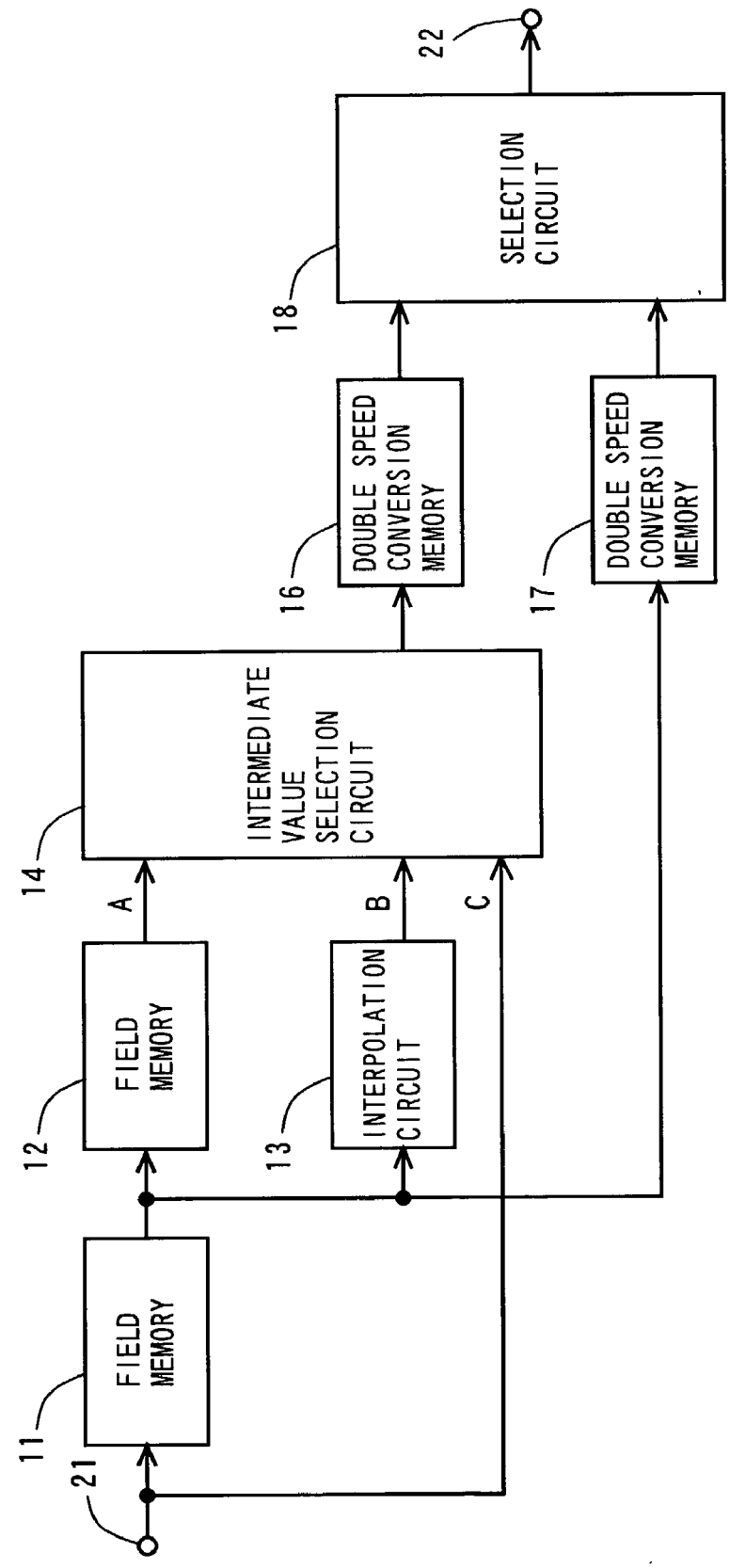
FIG. 12 is a block diagram showing the configuration of a vertical interpolation circuit included in a scanning lines interpolation circuit in the scanning lines interpolation apparatus shown in FIG. 11.

FIG. 12 is a block diagram showing an example of a vertical interpolation circuit used for the scanning lines interpolation circuit 200 in the scanning lines interpolation apparatus shown in FIG. 11.

The vertical interpolation circuit shown in FIG. 12 comprises field memories 11 and 12, an interpolation circuit 13, an intermediate value selection circuit 14, double speed conversion memories 16 and 17, and a selection circuit 18.

A picture signal of interlaced scanning is inputted to an input terminal 21. The picture signal inputted to the input terminal 21 is fed to the field memory 11 and the intermediate value selection circuit 14. The field memory 11 delays the picture signal by one field period, to output the delayed picture signal. The picture signal outputted from the field memory 11 is fed to the field memory 12, the interpolation circuit 13, and the double speed conversion memory 17. The field memory 12 delays the picture signal fed from the field memory 11 by one field period, to output the delayed picture signal.

When the picture signal outputted from the field memory 11 is taken as a picture signal in the n-th field, the picture signal inputted to the input terminal 21 is a picture signal in the (n+1)-th field, and the picture signal outputted form the field memory 12 is a picture signal in the (n−1)-th field. Here, n is a positive integer.

The interpolation circuit 13 generates an interpolation signal by pixels in the same field using the picture signal fed from the field memory 12.

The picture signal outputted from the field memory 12, the interpolation signal generated by the interpolation circuit 13, and the picture signal inputted to the input terminal 21 are fed to the intermediate value selection circuit 14. Letting A be a pixel value of the picture signal outputted from the field memory 12, B be a pixel value of the interpolation signal outputted from the interpolation circuit 13, and C be a pixel value of the picture signal inputted to the input terminal 21.

The intermediate value selection circuit 14 compares the pixel value A, the pixel value B, and the pixel value C for each pixel period, and selects an intermediate value out of the pixel value A, the pixel value B, and the pixel value C, to output the selected pixel value to the double speed conversion memory 16. Consequently, the pixel values outputted from the intermediate value selection circuit 14 are successively stored in the double speed conversion memory 16. The pixel values of the picture signal inputted to the input terminal 21 are successively stored in the double speed conversion memory 17.

Figures 13, 14:
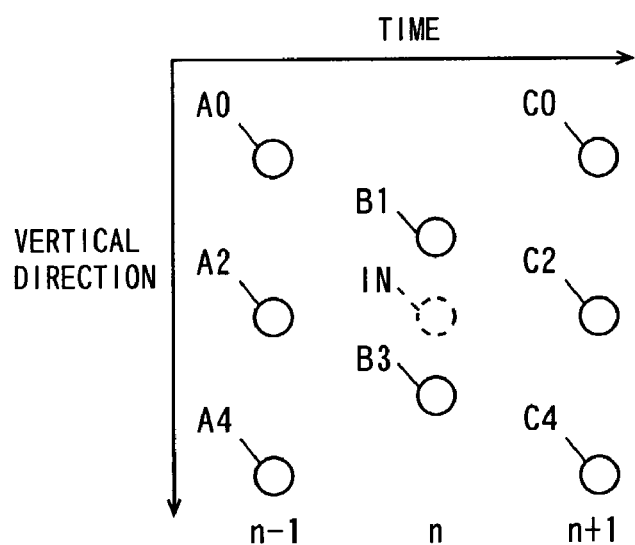
FIG. 13 is a diagram showing conditions for judging an intermediate value in an intermediate value selection circuit in the vertical interpolation circuit shown in FIG. 12.
FIG. 14 is a schematic view for explaining conventional scanning lines interpolation processing.
Figure 15:
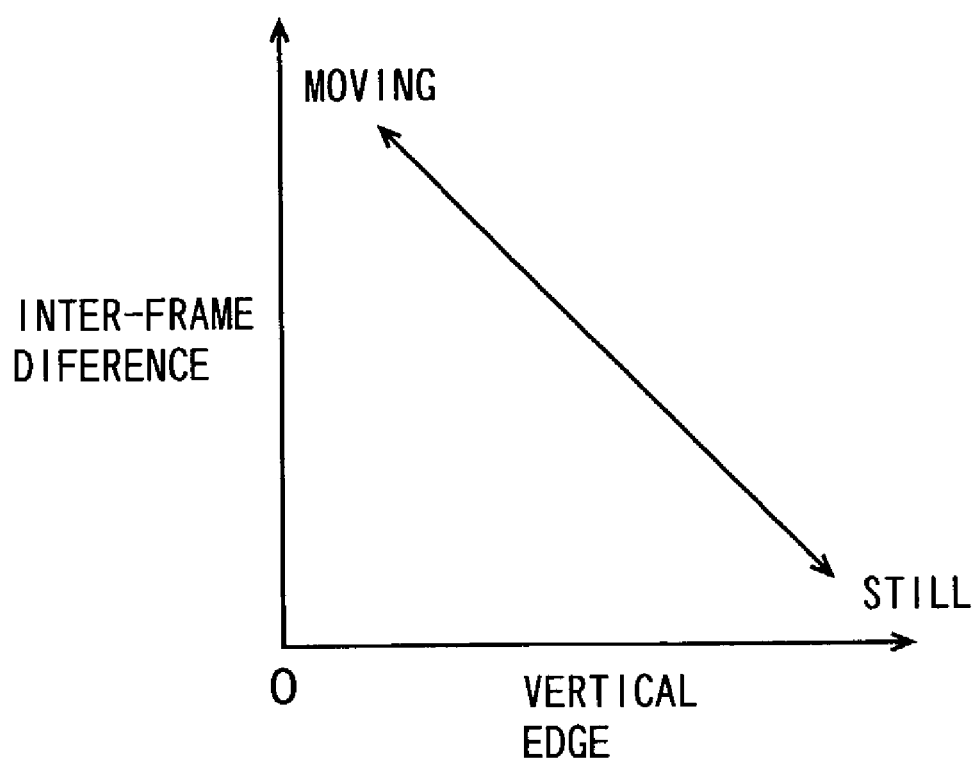
FIG. 15 is a diagram showing a method of judging the motion of a picture.

FIG. 13 is a diagram showing conditions for judging the intermediate value in the intermediate value selection circuit 14 shown in FIG. 12. As shown in FIG. 13, the pixel value A is selected in a case where $C \geq A > B$ or $B \geq A > C$. The pixel value B is selected in a case where $A > B > C$ or $C \geq B \geq A$. Further, the pixel value C is selected in a case where $A > C \geq B$ or $B > C \geq A$.

The selection circuit 18 shown in FIG. 12 alternately reads out the pixel value stored in the double speed conversion memory 16 and the pixel value stored in the double speed conversion memory 17 to an output terminal 22 in a period which is one-half the period of pixels composing the picture signal inputted to the input terminal 21. Consequently, a picture signal of progressive scanning is obtained at the output terminal 22.

Thus, an interpolation scanning line is produced by inter-field interpolation using a pixel signal in the (n–1)-th field when the pixel value A in the (n–1)-th field is judged to be an intermediate value, an interpolation scanning line is produced by inter-field interpolation using a pixel signal in the n-th field when the pixel value B is judged to be an intermediate value, and an interpolation scanning line is produced by inter-field interpolation using a pixel signal in the (n+1)-th field when the pixel value C in the (n+1)-th field is judged to be an intermediate value.

In the scanning lines interpolation apparatus shown in FIG. 11, the value of the interpolation pixel is found using the vertical interpolation circuit shown in FIG. 12 when the complete stillness judgment signal SL outputted from the stillness judgment apparatus 100 indicates that a picture is not in a completely still state.

In the scanning lines interpolation apparatus shown in FIG. 11, the value of the interpolation pixel may be calculated by inter-field interpolation without using the vertical interpolation circuit shown in FIG. 12 when the complete stillness judgment signal SL outputted from the stillness judgment apparatus 100 indicates that a picture is not in a completely still state.

According to the present invention, it is possible to accurately judge whether or not a picture stands still with respect to a vertically striped picture which moves in the horizontal direction and a horizontally striped picture which stands still, which pictures were not distinguishable in the prior art, using the presence or absence of the motion of a picture between frames and the presence or absence of a horizontal continuity of an inter-field vertical edge, to improve the precision of stillness judgment.

What is claimed is:

1. A stillness judgment apparatus that determines whether or not a picture stands till on the basis of a picture signal of an interlaced scanning system, comprising:
    an inter-frame motion detection device that calculates a difference value between a pixel in a field preceding a current field and a pixel in a field succeeding the current field in the same coordinates as those of a pixel to be interpolated in the current field on the basis of said picture signal, and detects a presence or absence of motion between frames on the basis of said difference value;
    a continuity detection device that finds signs of difference values between pixels in the preceding field or the succeeding field and pixels adjacent thereto on an upper or lower side in the current field on the basis of said picture signal, and detects a presence or absence of a horizontal continuity of an inter-field vertical edge based upon a determination of whether or not said signs are the same continuously over not less than a predetermined number of pixels, in a horizontal direction, including the pixel in the same coordinates as those of said pixel to be interpolated; and
    a judgment device that judges that the picture stands still when said inter-frame motion detection device detects that there is no motion between frames and said continuity detection device detects that there is horizontal continuity of the inter-field vertical edge.

2. The stillness judgment apparatus according to claim 1, wherein said continuity detection device replaces said difference value with a value of zero when the absolute value of the difference value between a pixel in the preceding field or the succeeding field and a pixel adjacent thereto on the upper or lower side in the current field is not more than a predetermined value.

3. The stillness judgment apparatus according to claim 2, wherein said continuity detection device detects that there is horizontal continuity of the inter-field vertical edge when the positive or negative signs of the difference values between pixels in the preceding field or the succeeding field and pixels adjacent thereto on the upper or lower side in the current field are not mixed in a range of not less than a predetermined number of pixels in the horizontal direction and the number of difference values of zero in said range is not more than a predetermined value.

4. The stillness judgment apparatus according to claim 1, wherein
    said continuity detection device detects the presence or absence of horizontal continuity of the inter-field vertical edge between the preceding field and the current field, and detects the presence or absence of horizontal continuity of the inter-field vertical edge between the succeeding field and the current field, and
    said judgment device judges that the picture stands still when said inter-frame motion detection device detects that there is no motion between frames and said continuity detection device detects in the same coordinates the horizontal continuity of the inter-field vertical edge between the preceding field and the current field and the horizontal continuity of the inter-field vertical edge between the succeeding field and the current field.

5. The stillness judgment apparatus according to claim 1, further comprising:
    a vertical edge detection device that calculates a difference value between said pixel to be interpolated and a pixel above or below said pixel to be interpolated in the current field, and detects whether or not a size of the inter-field vertical edge is not less than a predetermined value on the basis of said difference value, said judgment device also judging that the picture stands still when said inter-frame motion detection device detects that there is no motion between frames and said vertical edge detection device detects that the size of the inter-field vertical edge is not less than the predetermined value.

6. A stillness judgment apparatus that judges whether or not a picture stands still on the basis of a picture signal of an interlaced scanning system, comprising:

means for detecting an inter-frame motion to calculate a difference value between a pixel in a field preceding a current field and a pixel in a field succeeding the current field in the same coordinates as those of a pixel to be interpolated in the current field on the basis of the picture signal, and detecting a presence or absence of motion between frames on the basis of said difference value;

means for finding signs of difference values between pixels in the preceding field or the succeeding field and pixels adjacent thereto on an upper or lower side in the current field on the basis of said picture signal, and detecting a presence or absence of horizontal continuity of an inter-field vertical edge based upon a determination of whether or not the signs are the same continuously over not less than a predetermined number of pixels, in a horizontal direction, including the pixel in the same coordinates as those of said pixel to be interpolated; and means for judging that the picture stands still when said inter-frame motion detecting means detects that there is no motion between frames and said finding means detects that there is horizontal continuity of the inter-field vertical edge.

7. The stillness judgment apparatus according to claim 6, wherein said finding means replaces said difference value with a value of zero when an absolute value of the difference value between a pixel in the preceding field or the succeeding field and a pixel adjacent thereto on the upper or lower side in the current field is not more than a predetermined value.

8. The stillness judgment apparatus according to claim 7, wherein said finding means detects that there is horizontal continuity of the inter-field vertical edge when positive or negative signs of the difference values between pixels in the preceding field or the succeeding field and pixels adjacent thereto on the upper or lower side in the current field are not mixed in a range of not less than a predetermined number of pixels in the horizontal direction and the number of difference values of zero in said range is not more than a predetermined value.

9. The stillness judgment apparatus according to claim 6, wherein said finding means detects the presence or absence of horizontal continuity of the inter-field vertical edge between the preceding field and the current field, and detects the presence or absence of horizontal continuity of the inter-field vertical edge between the succeeding field and the current field, and said judging means judges that the picture stands still when said inter-frame motion detecting means detects that there is no motion between frames and said continuity detecting means detects in the same coordinates the horizontal continuity of the inter-field vertical edge between the preceding field and the current field and the horizontal continuity of the inter-field vertical edge between the succeeding field and the current field.

10. The stillness judgment apparatus according to claim 6, further comprising:

means for detecting a vertical edge to calculate a difference value between said pixel to be interpolated and a pixel above or below said pixel to be interpolated in the current field, and detecting whether or not a size of the inter-field vertical edge is not less than a predetermined value on the basis of said difference value, said judging means judging that the picture stands still when said inter-frame motion detection means detects that there is no motion between frames and said vertical edge detecting means detects that the size of the inter-field vertical edge is not less than the predetermined value.

11. A scanning lines interpolation apparatus, comprising:

a stillness judgment apparatus that determines whether or not a picture stands still on the basis of a picture signal of an interlaced scanning system; and a scanning lines interpolator that calculates a value of a pixel to be interpolated on the basis of a determination by said stillness judgment apparatus, to produce an interpolation scanning line, said stillness judgment apparatus comprising:

an inter-frame motion detector that calculates a difference value between a pixel in a field preceding a current field and a pixel in a field succeeding the current field in the same coordinates as those of a pixel to be interpolated in the current field on the basis of the picture signal, and detects a presence or absence of motion between frames on the basis of said difference value, a continuity detector that finds signs of difference values between pixels in the preceding field or the succeeding field and pixels adjacent thereto on an upper or lower side in the current field on the basis of said picture signal, and detects a presence or absence of a horizontal continuity of an inter-field vertical edge on the basis of a determination of whether or not said signs are the same continuously over not less than a predetermined number of pixels, in a horizontal direction, including the pixel in the same coordinates as those of said pixel to be interpolated, and a judgment device that determines that the picture stands still when said inter-frame motion detection device detects that there is no motion between frames and said continuity detector detects that there is horizontal continuity of the inter-field vertical edge.

12. The scanning lines interpolation apparatus according to claim 11, wherein said continuity detector replaces said difference value with a value of zero when the absolute value of the difference value between a pixel in the preceding field or the succeeding field and a pixel adjacent thereto on the upper or lower side in the current field is not more than a predetermined value.

13. The scanning lines interpolation apparatus according to claim 12, wherein said continuity detector detects that there is said horizontal continuity of the inter-field vertical edge when positive or negative signs of the difference values between pixels in the preceding field or the succeeding field and pixels adjacent thereto on the upper or lower side in the current field are not mixed in a range of not less than a predetermined number of pixels in the horizontal direction and the number of difference values of zero in said range is not more than a predetermined value.

14. The scanning lines interpolation apparatus according to claim 11, wherein said continuity detector detects the presence or absence of horizontal continuity of the inter-field vertical edge between the preceding field and the current field, and detects the presence or absence of horizontal continuity of the inter-field vertical edge between the succeeding field and the current field, and said judgment device determines that the picture stands still when said inter-frame motion detection device detects that there is no motion between frames and said continuity detector detects in the same coordinates the horizontal continuity of the inter-field vertical edge between the preceding field and the current field and the horizontal continuity of the inter-field vertical edge between the succeeding field and the current field.

15. The scanning lines interpolation apparatus according to claim 11, further comprising a vertical edge detector that calculates a difference value between said pixel to be interpolated and a pixel above or below said pixel to be interpolated in the current field, and detects whether or not the size of the inter-field vertical edge is not less than a predetermined value on the basis of said difference value, said judgment device determining that the picture stands still when said inter-frame motion detector detects that there is no motion between frames and said vertical edge detector detects that the size of the inter-field vertical edge is not less than the predetermined value.

16. A scanning lines interpolation apparatus, comprising:

a stillness judgment apparatus that determines whether or not a picture stands still on the basis of a picture signal of an interlaced scanning system; and a scanning lines interpolation circuit that calculates the value of a pixel to be interpolated on the basis of results of the determination by said stillness judgment apparatus, to produce an interpolation scanning line, said stillness judgment apparatus comprising:

means for detecting an inter-frame motion for calculating a difference value between a pixel in a field preceding the current field and a pixel in a field succeeding the current field in the same coordinates as those of a pixel to be interpolated in the current field on the basis of the picture signal, and detecting a presence or absence of motion between frames on the basis of said difference value, means for finding signs of difference values between pixels in the preceding field or the succeeding field and pixels adjacent thereto on an upper or lower side in the current field on the basis of said picture signal, and detecting a presence or absence of horizontal continuity of an inter-field vertical edge based upon a determination of whether or not said signs are the same continuously over not less than a predetermined number of pixels, in a horizontal direction, including the pixel in the same coordinates as those of said pixel to be interpolated, and means for judging that the picture stands still when said inter-frame motion detection means detects that there is no motion between frames and said finding means detects that there is horizontal continuity of the inter-field vertical edge.

17. The scanning lines interpolation apparatus according to claim 16, wherein said finding means replaces said difference value with a value of zero when the absolute value of the difference value between a pixel in the preceding field or the succeeding field and a pixel adjacent thereto on the upper or lower side in the current field in not more than a predetermined value.

18. The scanning lines interpolation apparatus according to claim 17, wherein said finding means detects that there is horizontal continuity of the inter-field vertical edge when positive or negative signs of the difference values between pixels in the preceding field or the succeeding field and pixels adjacent thereto on the upper or lower side in the current field are not mixed in a range of not less than a predetermined number of pixels in the horizontal direction and the number of difference values of zero in said range is not more than a predetermined value.

19. The scanning lines interpolation apparatus according to claim 16, wherein said finding means detects the presence or absence of horizontal continuity of the inter-field vertical edge between the preceding field and the current field, and detects the presence or absence of horizontal continuity of the inter-field vertical edge between the succeeding field and the current field, and said judging means determines that the picture stands still when said inter-frame motion detecting means detects that there is no motion between frames and said finding means detects in the same coordinates the horizontal continuity of the inter-field vertical edge between the preceding field and the current field and the horizontal continuity of the inter-field vertical edge between the succeeding field and the current field.

20. The scanning lines interpolation apparatus according to claim 16, further comprising:

means for detecting a vertical edge for calculating a difference value between said pixel to be interpolated and a pixel above or below said pixel to be interpolated in the current field, and detecting whether or not the size of the inter-field vertical edge is not less than a predetermined value on the basis of said difference value, said judging means determining that the picture stands still when said inter-frame motion detecting means detects that there is no motion between frames and said vertical edge detecting means detects that the size of the inter-field vertical edge is not less than the predetermined value.

* * * * *

UNITED STATES PATENT AND TRADEMARK OFFICE
CERTIFICATE OF CORRECTION

PATENT NO. : 6,999,128 B2
APPLICATION NO. : 10/203632
DATED : February 14, 2006
INVENTOR(S) : Mitsuhiro Kasahara et al.

It is certified that error appears in the above-identified patent and that said Letters Patent is hereby corrected as shown below:

At column 22, line 3 (claim 1, line 2) of the printed patent, "till" should be --still--.

Signed and Sealed this

Nineteenth Day of December, 2006

JON W. DUDAS
*Director of the United States Patent and Trademark Office*